(12) United States Patent
Barsook et al.

(10) Patent No.: US 10,091,460 B2
(45) Date of Patent: Oct. 2, 2018

(54) ASYNCHRONOUS ONLINE VIEWING PARTY

(75) Inventors: Jonathan David Barsook, Los Angeles, CA (US); David Christian Ehlers, Burbank, CA (US); Jason Richard Grant, Valencia, CA (US); Khai Tuan Tran, Burbank, CA (US); David John Watson, Valencia, CA (US); Nicklas Lee Wilson, Woodland Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1053 days.

(21) Appl. No.: 12/058,787

(22) Filed: Mar. 31, 2008

(65) Prior Publication Data

US 2009/0249223 A1  Oct. 1, 2009

(51) Int. Cl.
*G06F 3/048* (2013.01)
*H04N 7/15* (2006.01)

(52) U.S. Cl.
CPC .............. *H04N 7/15* (2013.01); *G06F 3/048* (2013.01)

(58) Field of Classification Search
USPC .................................................. 715/753, 751
See application file for complete search history.

(56) References Cited

U.S. PATENT DOCUMENTS

| | | | | |
|---|---|---|---|---|
| 6,119,147 A * | 9/2000 | Toomey | ............... | G06Q 10/109 709/204 |
| 6,321,252 B1 | 11/2001 | Bhola et al. | | |
| 7,213,051 B2 * | 5/2007 | Zhu | ...................... | H04L 12/1831 709/204 |
| 7,487,210 B2 * | 2/2009 | Ludwig | .................. | G06Q 10/10 709/204 |
| 7,499,926 B1 * | 3/2009 | Burckart | ............. | H04L 12/1831 |
| 7,673,327 B1 * | 3/2010 | Polis | .................... | G06F 17/3089 713/151 |
| 7,716,376 B1 * | 5/2010 | Price | ......................... | G06F 1/12 709/248 |

(Continued)

FOREIGN PATENT DOCUMENTS

WO  WO99046702 A1  9/1999

OTHER PUBLICATIONS

"Copy Group Memberships the easy way," http://www.itprotoday.com/management-mobility/copy-group-memberships-easy-way, 2006, hereinafter "copy group", 5 pages.*

*Primary Examiner* — Ryan Barrett
*Assistant Examiner* — Haimei Jiang
(74) *Attorney, Agent, or Firm* — Farjami & Farjami LLP

(57) ABSTRACT

Various embodiments of systems, methods, computer devices, and computer software for providing an asynchronous online viewing party are provided. One embodiment comprises a system for providing an online viewing party. One such system comprises: a server operatively coupled to a database for supporting the online viewing party, the database comprising: content to be asynchronously provided to participants of the online viewing party; and time-based events provided by one or more of the participants, the time-based events associated with the content and linked to corresponding locations in the content; and a user interface configured to interface with the server, the user interface comprising logic configured to display the content and the time-based events.

18 Claims, 28 Drawing Sheets

(56) References Cited

U.S. PATENT DOCUMENTS

| | | | |
|---|---|---|---|
| 7,739,584 B2* | 6/2010 | Vella | H04N 5/445 715/200 |
| 8,387,088 B2* | 2/2013 | Roberts | H04N 7/17318 725/37 |
| 2002/0056119 A1* | 5/2002 | Moynihan | H04L 29/06027 725/87 |
| 2004/0021685 A1* | 2/2004 | Denoue | G06F 17/30017 715/721 |
| 2004/0098754 A1* | 5/2004 | Vella | H04N 5/445 725/135 |
| 2004/0125133 A1* | 7/2004 | Pea | G06F 17/30014 715/751 |
| 2005/0227218 A1 | 10/2005 | Mehta et al. | |
| 2005/0262051 A1* | 11/2005 | Dettinger | G06F 17/30525 |
| 2006/0168558 A1* | 7/2006 | de Seabra e Melo | G06F 8/71 717/105 |
| 2006/0242234 A1* | 10/2006 | Counts | H04W 4/08 709/204 |
| 2007/0031805 A1* | 2/2007 | Fox | G09B 5/06 434/350 |
| 2007/0136656 A1* | 6/2007 | Nydam | G06F 17/24 715/205 |
| 2007/0174759 A1* | 7/2007 | Ando | G11B 20/00086 715/203 |
| 2007/0219938 A1* | 9/2007 | Boersma | G06F 17/30241 |
| 2007/0266304 A1* | 11/2007 | Fletcher | G06F 17/241 715/230 |
| 2007/0288836 A1* | 12/2007 | Partovi | H04M 3/4938 715/202 |
| 2008/0052630 A1* | 2/2008 | Rosenbaum | G06F 17/30864 715/738 |
| 2008/0132252 A1* | 6/2008 | Altman | G06Q 30/0207 455/457 |
| 2008/0235595 A1* | 9/2008 | Krantz | G11B 27/036 715/741 |
| 2008/0275881 A1 | 11/2008 | Conn et al. | |
| 2008/0313570 A1* | 12/2008 | Shamma | G06F 17/30525 715/846 |
| 2009/0002477 A1* | 1/2009 | Cutler | G06K 9/00711 348/14.1 |
| 2009/0007200 A1* | 1/2009 | Amento | H04N 7/173 725/100 |
| 2009/0024671 A1 | 1/2009 | Johnson et al. | |
| 2009/0063991 A1* | 3/2009 | Baron | G06Q 10/10 715/751 |
| 2009/0089097 A1* | 4/2009 | Schoenberg | G06F 19/3431 705/3 |
| 2009/0119369 A1* | 5/2009 | Chou | 709/205 |
| 2009/0138828 A1* | 5/2009 | Schultz | G06Q 10/10 715/853 |
| 2009/0164904 A1* | 6/2009 | Horowitz | G06F 17/30817 715/723 |
| 2009/0193032 A1* | 7/2009 | Pyper | G06Q 30/02 |
| 2009/0210779 A1* | 8/2009 | Badoiu et al. | 715/230 |
| 2009/0254933 A1* | 10/2009 | Gupta | H04H 20/14 725/14 |
| 2009/0300475 A1* | 12/2009 | Fink et al. | 715/230 |
| 2009/0307614 A1* | 12/2009 | Craig | G06Q 10/107 715/758 |
| 2010/0306671 A1* | 12/2010 | Mattingly | G06Q 10/10 715/753 |
| 2011/0314041 A1* | 12/2011 | Drucker et al. | 707/769 |

* cited by examiner

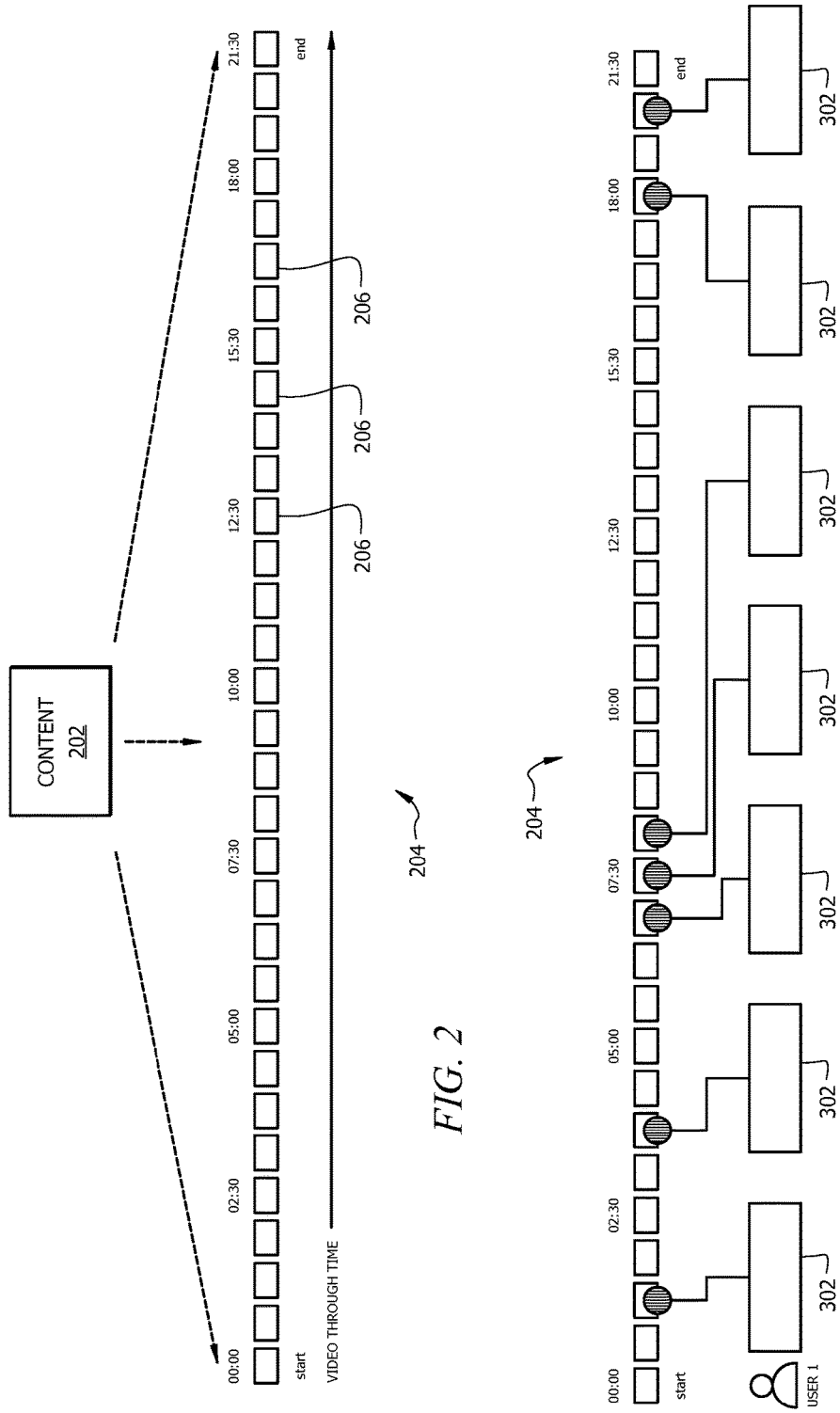

ASYNCHRONOUS ONLINE VIEWING PARTY

BACKGROUND

The Internet and the World Wide Web (WWW, or "Web") provide various ways for people to interact with each other, including, for example, email, chat rooms, web logs (commonly referred to as "blogs"), discussion boards or forums, and social networking applications. Some of these and other forms of communication support the creation of online communities comprising groups of people with common interests who interact through the Internet and the Web. A popular area of interest for online communities includes movies, television programs, online videos, user-generated content, or other offline or online content.

Currently there are numerous online communities that have been created to enable members to exchange messages about the content of common interest. The content of common interest is viewed, played, or otherwise consumed by the members of the online community, either online or offline, and then the members engage in an online discussion about the content. For example, there are a number of blogs, chat boards, and discussion boards through which users frequently discuss the consumed content.

One type of community is a blog, which is a website in which entries are commonly displayed in reverse chronological order. The blog author posts commentary regarding the consumed content. A typical blog may combine text, images, and links to other blogs, web pages, and other media related to the consumed content. Some blogs include an interactive feature that enables readers to comment on the posted content or the consumed content. Chat rooms are another form of online discussion. A chat room enables multiple users to share text messages in real-time, either one-on-one or as part of a group. Chat rooms are considered synchronous because, from the perspective of the user, the messages occur in real-time (i.e., the communication tool requires the users to be present in the chat room at the same time). Discussion boards or forums are similar to chat rooms, although the messages do not necessarily occur in real-time.

A relatively new online community tool, referred to as an online viewing party, enables members to collaborate in an online environment by exchanging messages and other commentary, while simultaneously viewing the consumed content. Members can schedule viewing parties and invite other members to the online environment. The consumed content is presented to the members in real-time, either online in association with the online viewing party or offline via a linear television broadcast or other delivery method. Online viewing parties have gained popularity as a medium for consuming online and offline programming. However, existing online viewing party applications are synchronous, requiring all viewers to be online at the same time in the same manner as a chat room model. The chat room model has a number of drawbacks. The viewers must be online at the same time. Because of the real-time limitations, the chat room model must have a large supporting community to ensure adequate participation. Furthermore, a chat room requires costly moderation.

Despite the success and popularity of these types of online communities, there remains a need in the industry for improved systems, methods, computing devices, and computer software for providing online viewing parties.

SUMMARY

Various embodiments of systems, methods, computer devices, and computer software are disclosed for providing an asynchronous online viewing party. One embodiment comprises a system for providing an online viewing party. One such system comprises a server operatively coupled to a database for supporting the online viewing party. The database comprises content that may be asynchronously provided to participants of the online viewing party and time-based events provided by one or more of the participants. The time-based events are associated with the content and linked to corresponding locations in the content, and the system also includes a user interface configured to interface with the server. The user interface comprises logic configured to display the content and the time-based events.

Another embodiment comprises a method for providing an online viewing party. One such method comprises defining content to be asynchronously displayed to a plurality of participants in the online viewing party via a user interface, receiving a member-generated event via the user interface from a first participant, the member-generated event corresponding to the content displayed via the user interface, linking the member-generated event to a location in the content, and displaying the content and the member-generated event to a second participant via the user interface. The member-generated event is displayed at the corresponding location in the content.

A further embodiment comprises a computer program embodied in a computer-readable medium for providing an online viewing party. The computer program comprises logic elements configured to define an online viewing party having content to be asynchronously displayed to a plurality of participants via a user interface, to receive a member-generated event via the user interface from a first participant, the member-generated event corresponding to the content displayed via the user interface, to link the member-generated event to a location in the content, and to display the content and the member-generated event to a second participant via the user interface. The member-generated event is displayed at the corresponding location in the content.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

FIG. 2 is schematic diagram illustrating a data structure for a data timeline associated with content displayed via the asynchronous online viewing party platform of FIG. 1.

FIG. 3 is a schematic diagram illustrating a data structure for mapping member-generated events associated with the content to the timeline of FIG. 2.

DETAILED DESCRIPTION

Various embodiments of systems, methods, computing devices, and computer software for implementing an asynchronous online viewing party are disclosed. As mentioned above and described below in detail with reference to FIGS. 1-30, an asynchronous online viewing party (AOVP) is a form of multi-user communication via a computer network such as the WWW portion of the Internet. In general, an AOVP comprises an online viewing party that enables a plurality of users, members, or viewers (referred to as members or participants) to view, interact with, or otherwise consume the content in an asynchronous manner. In this regard, individual members may view and interact with the consumed content at different times and on their own schedules. Unlike existing online viewing parties, the members are not required to consume the content at the same time. As each member consumes the content, the member may generate comments at any specific points in time in the content or at any specific locations in the content. The user-generated comments may be linked to the content according to a time code (e.g., a timestamp or time slot), although in other embodiments the user-generated comments may be linked to the content based on the locations within the content, using for example, tags or other software-based hooks linked to the content. A supporting application links the user-generated event to the content so that, as subsequent members consume the content, they are able to selectively view all of the user-generated comments in association with the content. The AVOP application includes presentation and management functionality to enable members to create an AOVP, search for available AOVPs, join an AOVP, navigate content within an AOVP, and manage which members' user-generated events are displayed with the content.

Figure 1:
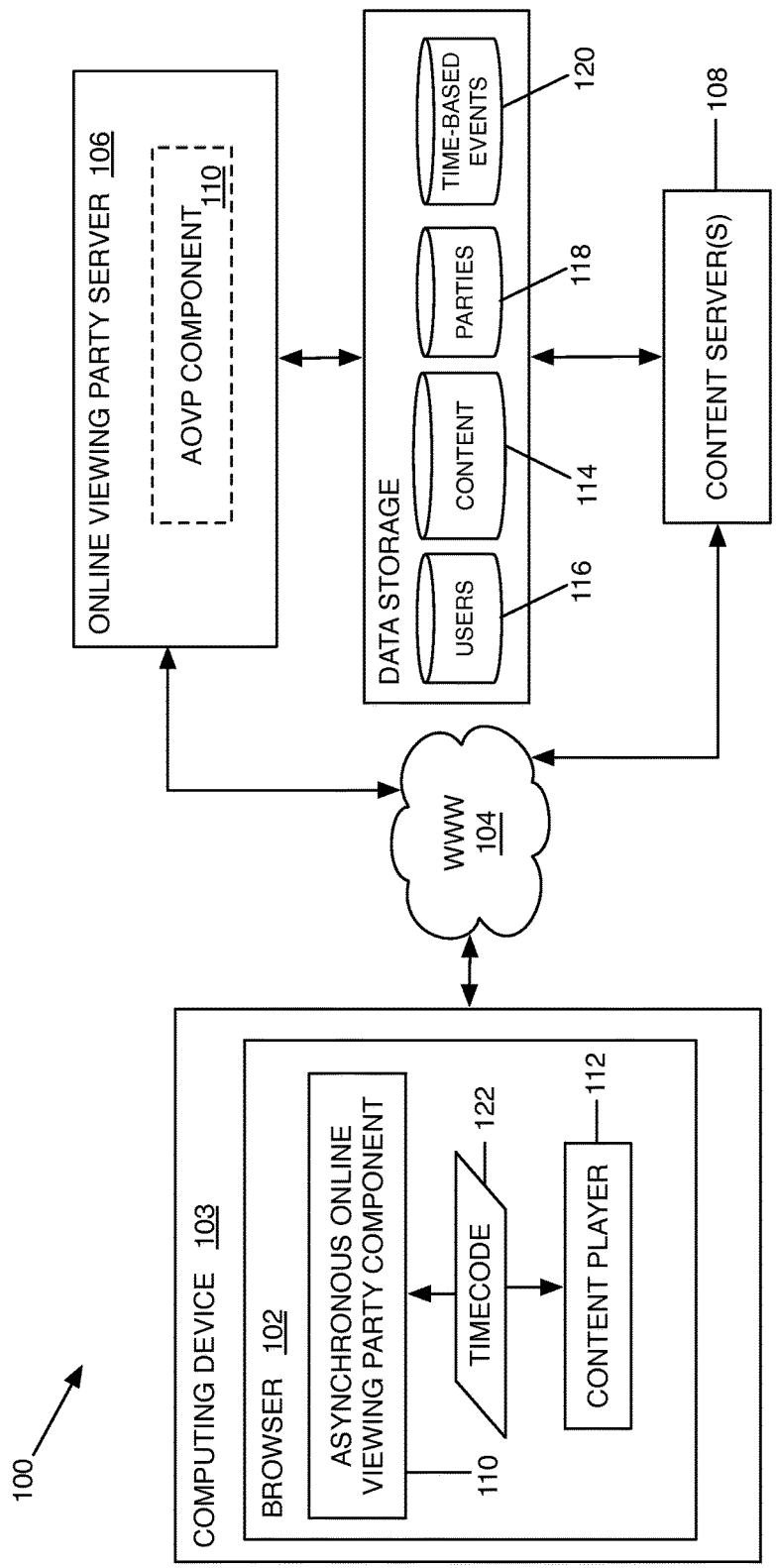
FIG. 1 is a block diagram illustrating an embodiment of a computer system for implementing an asynchronous online viewing party platform.

FIG. 1 illustrates a computer system 100 representing an exemplary working environment for implementing various embodiments of an AOVP. The computer system 100 comprises a user interface (e.g., a browser 102) configured to communicate with one or more servers via a computer network, such as, for example, the WWW 104. The user interface 102 resides on any suitable computing device 103 adapted for communication with the server(s). The computing device 103 may comprise, for example, a personal computer, a laptop computer, a mobile computing device, or any other suitable computing device. The browser 102 functions as an interface between the computing device 103 and an online viewing party server 106 and one or more content server(s) 108. Servers 106 and 108 may be combined into a single server or collection of associated servers or remotely distributed and operatively connected to each other. The functionality of the AOVP is provided via this interface and two basic components for providing the AOVP functionality: an AOVP component 110 and a content player 112. The AOVP component 110 interfaces with the online viewing party server 106, and the content player 112 interfaces with the content server(s) 108. The content player 112 comprises logic configured to present content to the members via the browser 102. The content player 112 may be integrated with the browser 102 (as illustrated in the embodiment of FIG. 1), although in other embodiments the content player 112 or other logic associated with the AOVP component 110 may be implemented by the browser 102 or browser plug-in applications. The content may be digital content, analog content, or any other content. It should be appreciated that the digital content consumed during an AOVP may include audio, video, text, still images, animation (or any combination thereof), and associated interactive features. The digital content may comprise user-generated content, television programs, movies, or any other digital content from any source. The digital content may be stored in a content database 114 accessible by the content server(s) 108 and the online viewing party server 106.

The computer system 100 further comprises additional data for supporting an AOVP (e.g., a member database 116, a parties database 118, and a time-based events database 120). The member database 116 stores data associated with member profiles. The parties database 118 maintains data related to the AOVPs created by the members. The time-based events database 120 stores the member-generated events which are temporally linked to the content stored in the content database 114. In this regard, the AOVP component 110 and the content player 112 are configured to pass one or more timecodes 122 between each other.

As illustrated in FIG. 2, the content 202 being consumed via a particular AOVP may include an associated timeline 204. The timeline 204 may define a plurality of time slots, intervals, or other time references related to the content 202. In FIG. 2, the time references are visually represented by time blocks 206. Each time block 206 may correspond to a location along the timeline 204 and define a corresponding timecode 122. In this manner, as illustrated in FIG. 3, the timecode 122 may be used by the AOVP component 110 and the content player 112 to link member-generated events 302 to the timeline 204 associated with the content 202. For example, when a first member generates a comment at a particular time along the timeline 204, an associated timecode 122 may be received from the content player 112. The timecode 122 and the data related to the first member's comment may be provided to the online viewing party server 106 and then stored in the events database 120 and/or in the content database 114. The timecodes 122 may be stored in association with a member identifier. Therefore, when a second member subsequently consumes the AOVP, the first member's comments may be presented along with the content 202.

Figure 4:
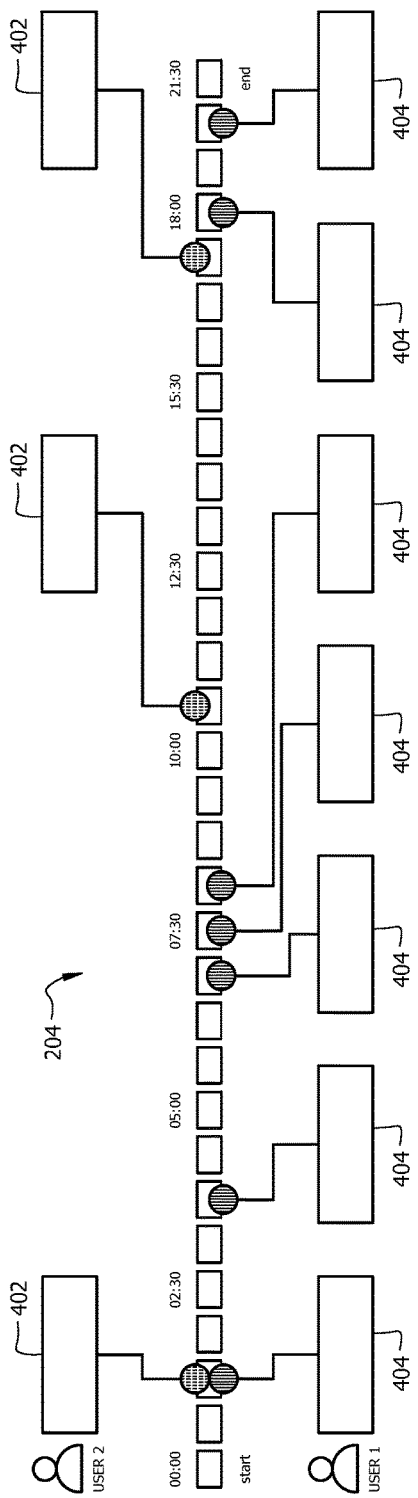
FIG. 4 is a schematic diagram illustrating the data structure of FIG. 3 for multiple members.

An AOVP may include a plurality of members, each of which may create member-generated events 302 when consuming the content 202. As member-generated events 302 are mapped to the content 202, subsequent members have the ability to select which member comments to view in relation to the content 202. As illustrated in FIG. 4, in one embodiment, the user interface (e.g., browser 102) and AOVP component 110 may be adapted to display a representation of the timeline 204. The user interface may layer member-generated events for multiple members. For example, in the exemplary embodiment of FIG. 4, member-generated events 402 (displayed above the timeline 204) correspond to a first member and member-generated events 404 (displayed below the timeline 204) correspond to a second member. In one embodiment, the member-generated events 402 and 404 are displayed as text boxes, although the events may comprise various types of commentary or other functionality.

Figure 5:
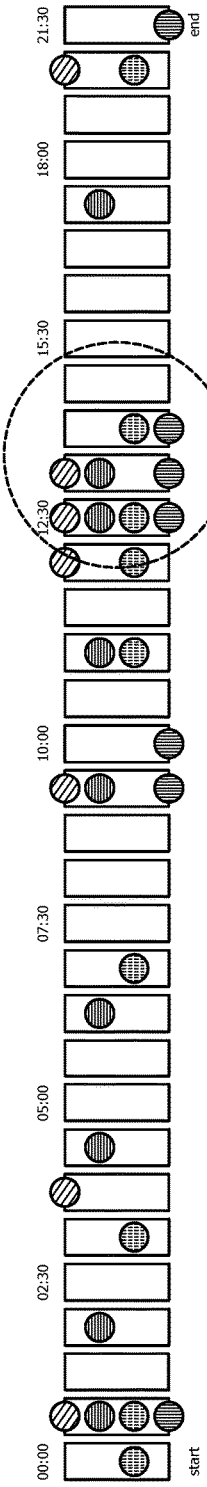
FIG. 5 is a schematic diagram of an embodiment of a user interface mechanism for illustrating member-generated events associated with multiple members on a timeline corresponding to the content being displayed.

It should be appreciated that the AOVP component 110 may be configured with appropriate presentation and management logic to enable a member to specify which member comments to display. Furthermore, the user interface may be adapted to overlay the comments in various ways. FIG. 5 illustrates an alternative way for representing the timeline 204 in the user interface. In this embodiment, the member-generated events are stacked along the timeline 204 as color-coded circles, with each member being assigned a different color. The user interface may include a member legend identifying the members and their corresponding colors. In this manner, the timeline 204 may function as a convenient dashboard that enables relevant portions of the content 202 to be easily identified based on the comment density, or other factors. For example, in FIG. 5, the dotted circle 502 highlights, for reference purposes, a portion of the timeline 204 with multiple comment threads. In this embodiment, the content of the events are not initially displayed in the user interface, although the user interface may include a mechanism for enabling the events to be selected and displayed (e.g., a mouse-over preview functionality).

Figure 6:
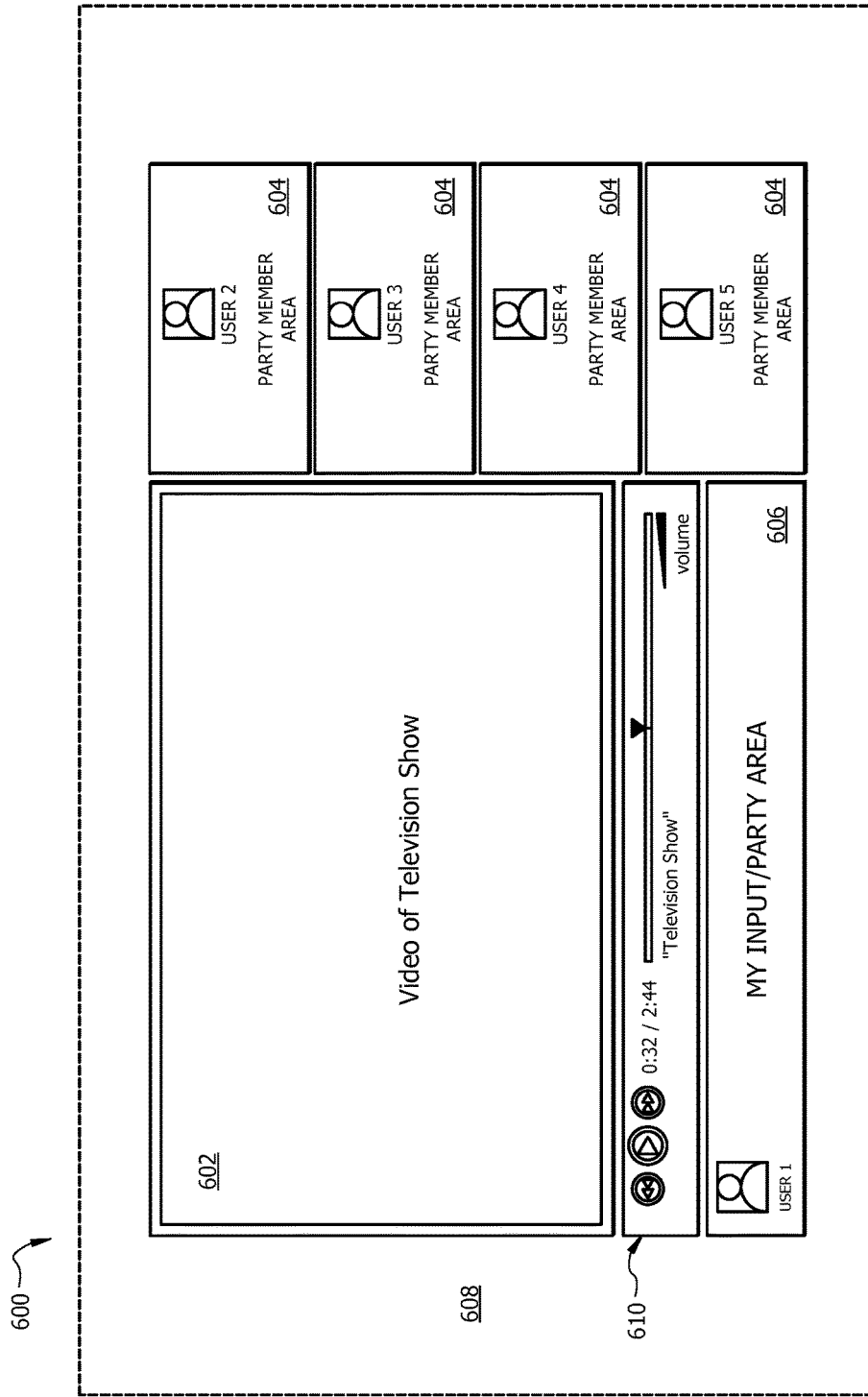
FIG. 6 is a schematic diagram of a user interface structure for implementing an asynchronous online viewing party via the platform of FIG. 1.

FIG. 6 illustrates a schematic representation of one of a number of possible embodiments of a user interface structure 600 for implementing an AOVP. In the embodiment illustrated in FIG. 6, the user interface structure 600 comprises a video panel 602, a plurality of Party Member Area panels 604, a My Input/Party Area panel 606, and a themeable interface area 608. The themeable interface area 608 may display information related to the AOVP or information identifying for example, a content provider associated with the AOVP. The video panel 602 is the portion of the user interface in which the content 202 is displayed. The video panel 602 may include a content navigation mechanism 610, which has a volume control, a fast-forward button, a rewind button, a play button, and a status feature, along with any other control features. The status feature displays the title of the content 202, in this case an episode of a television program, and the elapsed time of the program.

Figure 8:
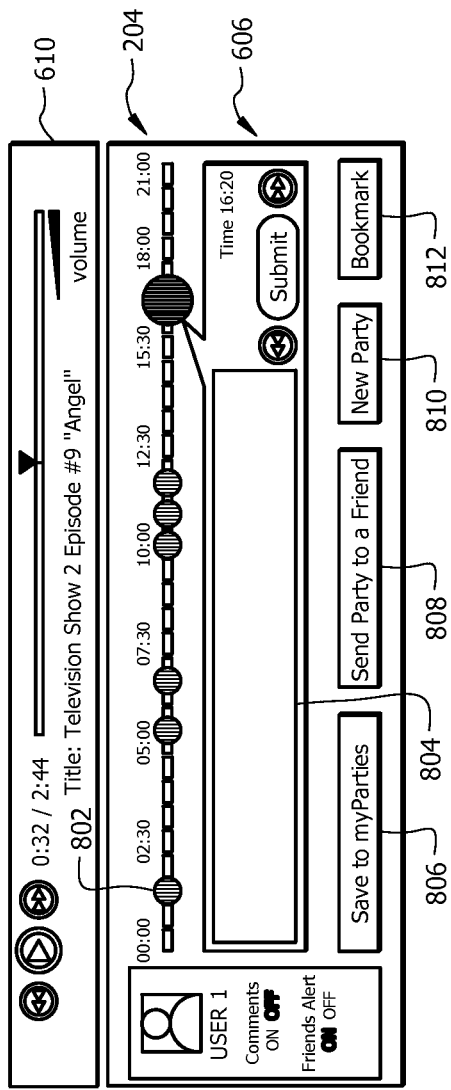
FIG. 8 is a detailed view of the "My Input/Party Area" of the user interface structure of FIGS. 6 and 7.

The My Input/Party Area panel 606 is the portion of the user interface for enabling the member consuming the video to generate events. Referring to FIG. 8, the My Input/Party Area panel 606 may display the timeline 204 with icons 802 indicating the location of the member-generated events. To generate an event, the member may select the location within the timeline 204, which presents a dynamic comment entry tool 804. In an embodiment, the entry tool 804 includes a text entry portion, fast-forward and rewind controls for controlling the insertion location, and a submit button. The My Input/Party Area panel 606 may also include additional buttons for accessing other features. In the embodiment illustrated in FIG. 8, the panel 606 includes, for example, a "Save to myParties" button 806, a "Send Party to a Friend" button 808, a "New Party" button 810, and a "Bookmark" button 812.

Figure 7:
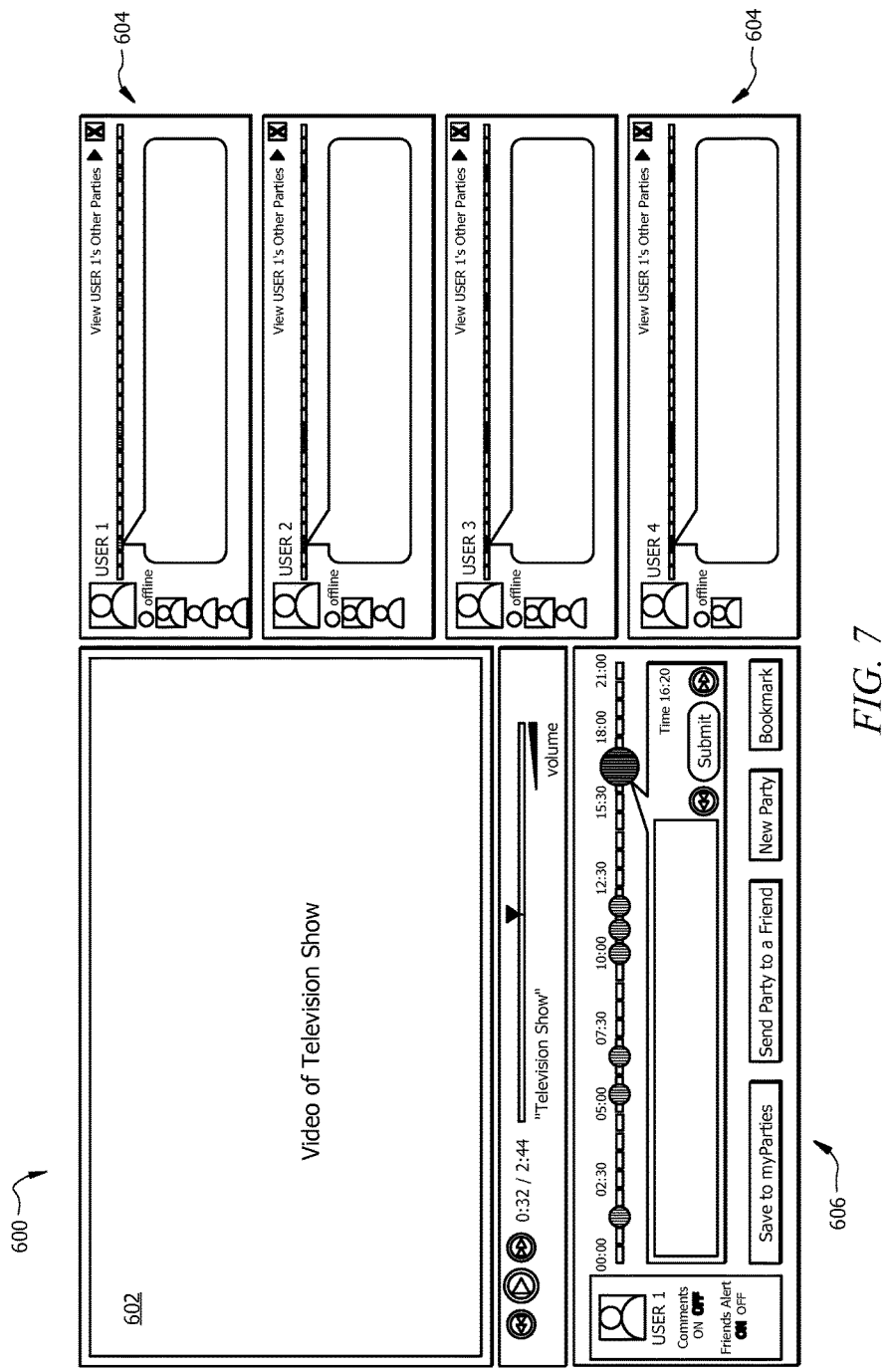
FIG. 7 is a detailed schematic diagram of the "My Input/Party Area" and "Party Member Areas" of the user interface structure of FIG. 6.
Figure 9:
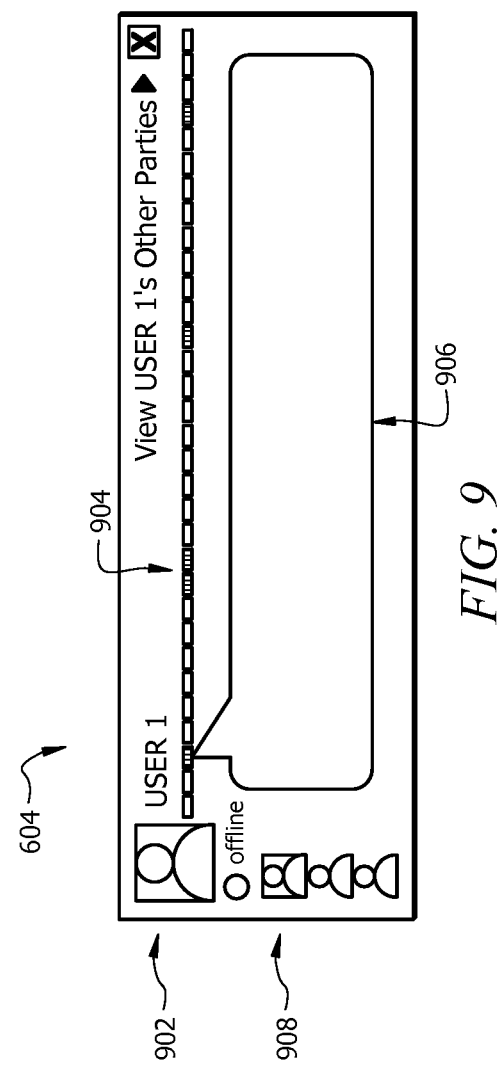
FIG. 9 illustrates a detailed view of a "Party Member Area".

In an embodiment, the Party Member Area panels 604 comprise member-specific areas for identifying the member and displaying information related to the member-generated events associated with the content being displayed in the video panel 602. As best illustrated in FIGS. 7 and 9, each Party Member Area panel 604 may include a member timeline 904 displaying the general location of the member-generated events along the timeline. In an embodiment, as the video is played in the video panel 602, the member-generated events may appear as a pop-up window 906, or other communication. The member timeline 904 automatically advances during the playback of the video. A Party Member Area panel 604 may display the member's screen name and a member-specified avatar 902, as well as display whether the member is online or offline. The panel 604 may also display various additional clickable icons 908 for accessing information about the member (e.g., friends, favorites, etc.).

Figure 10:
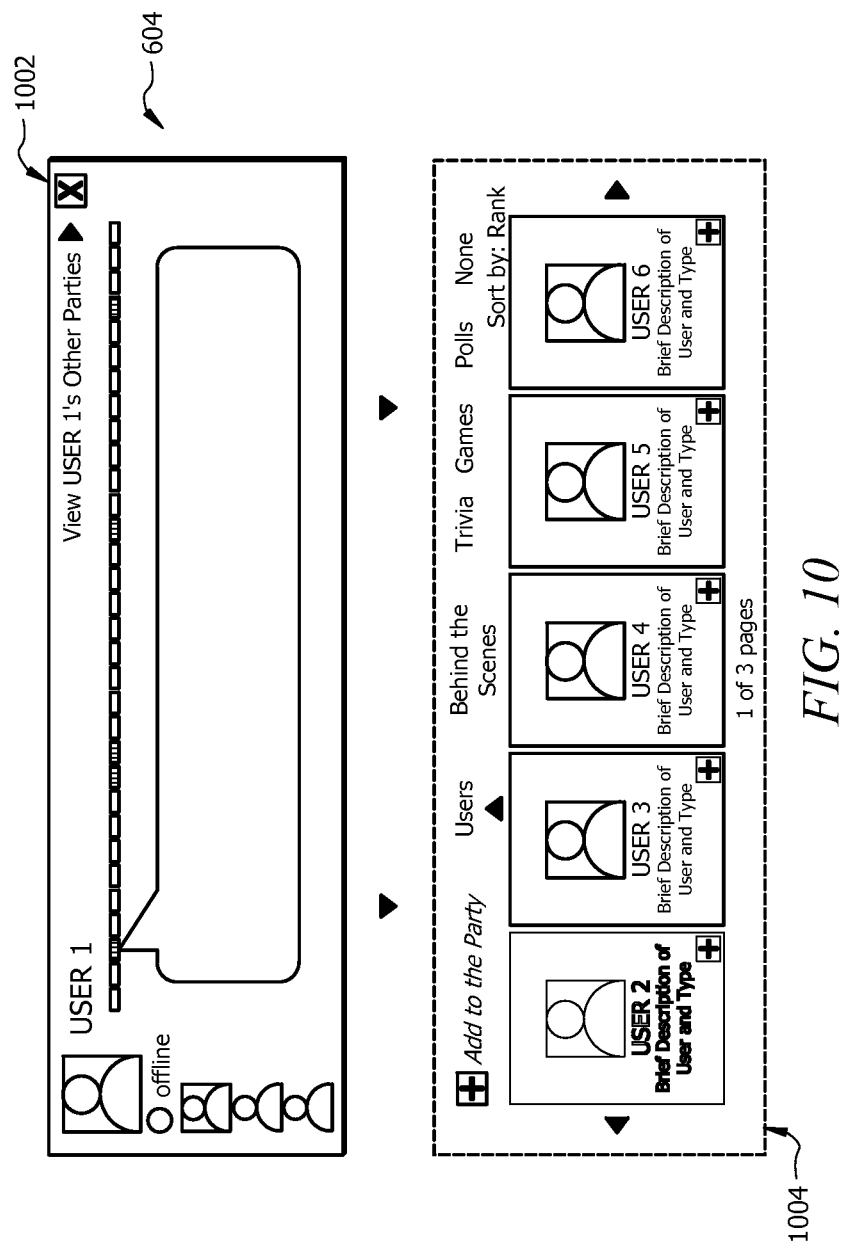
FIG. 10 is a schematic diagram of a user interface mechanism for editing members displayed in the "Party Member Areas".
Figure 11:
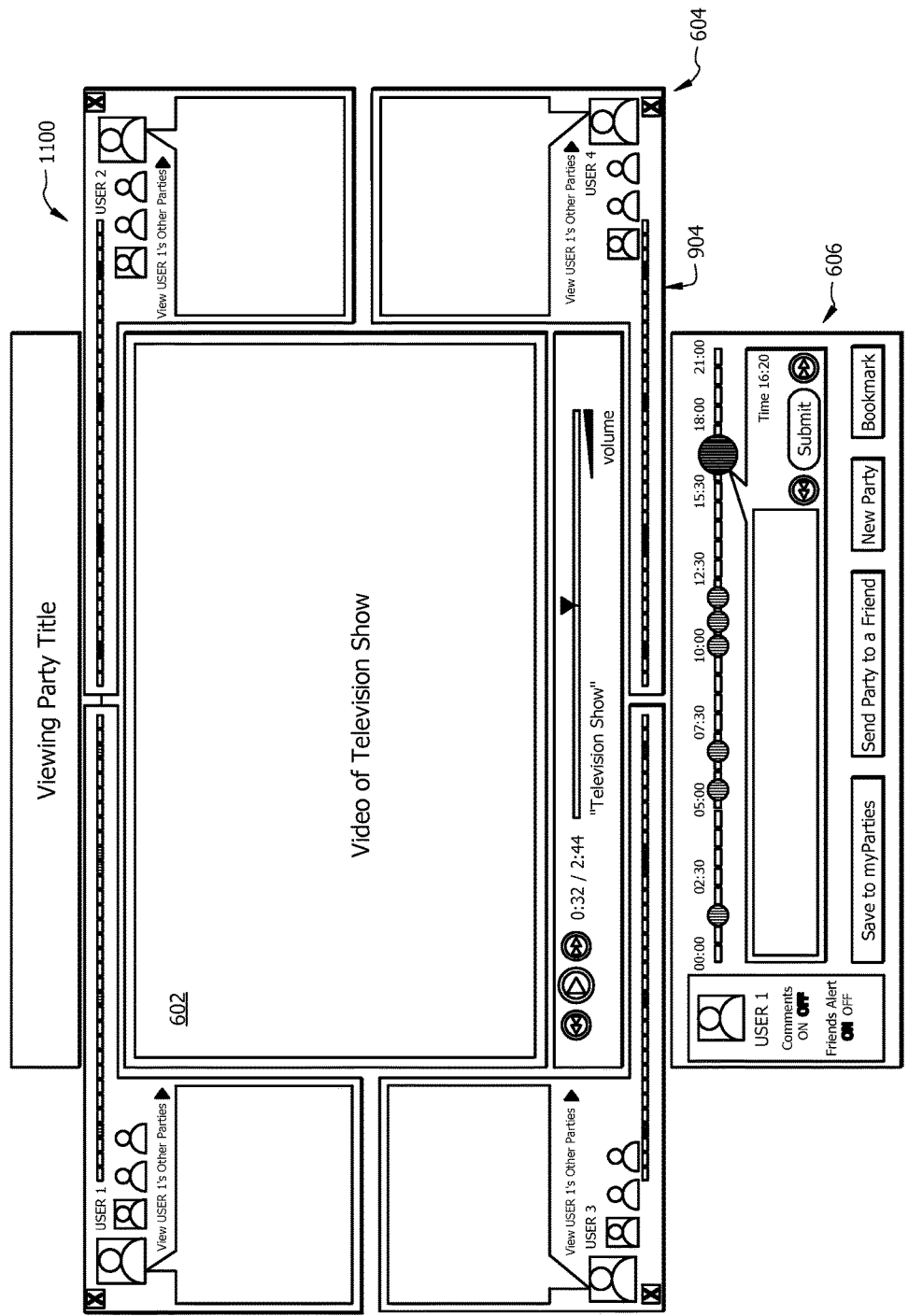
FIG. 11 is a schematic diagram of an embodiment of a four-member quadrant interface structure for implementing an asynchronous online viewing party via the platform of FIG. 1.
Figure 12:
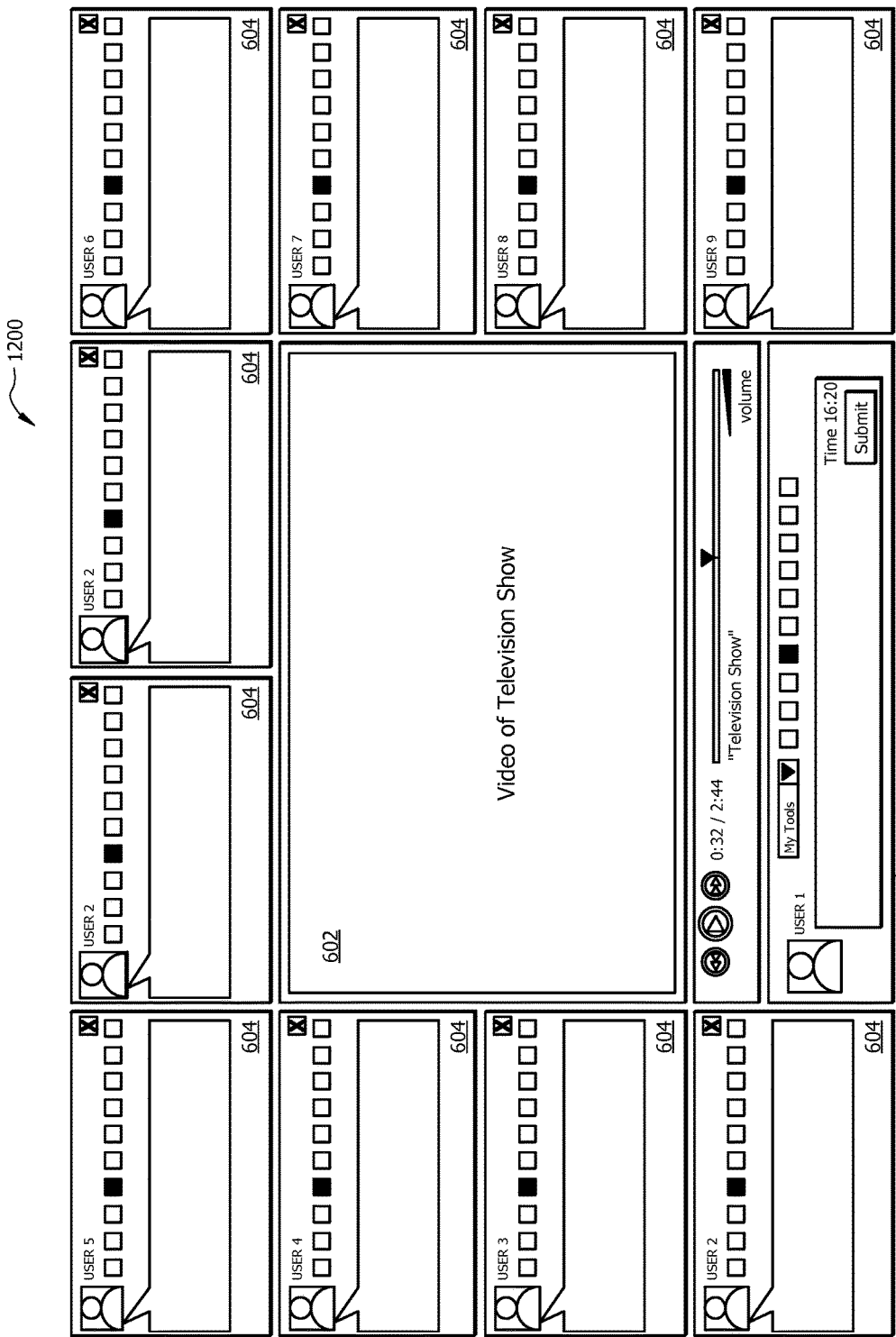
FIG. 12 is a schematic diagram of another embodiment of a user interface structure for implementing an asynchronous online viewing party.
Figure 13:
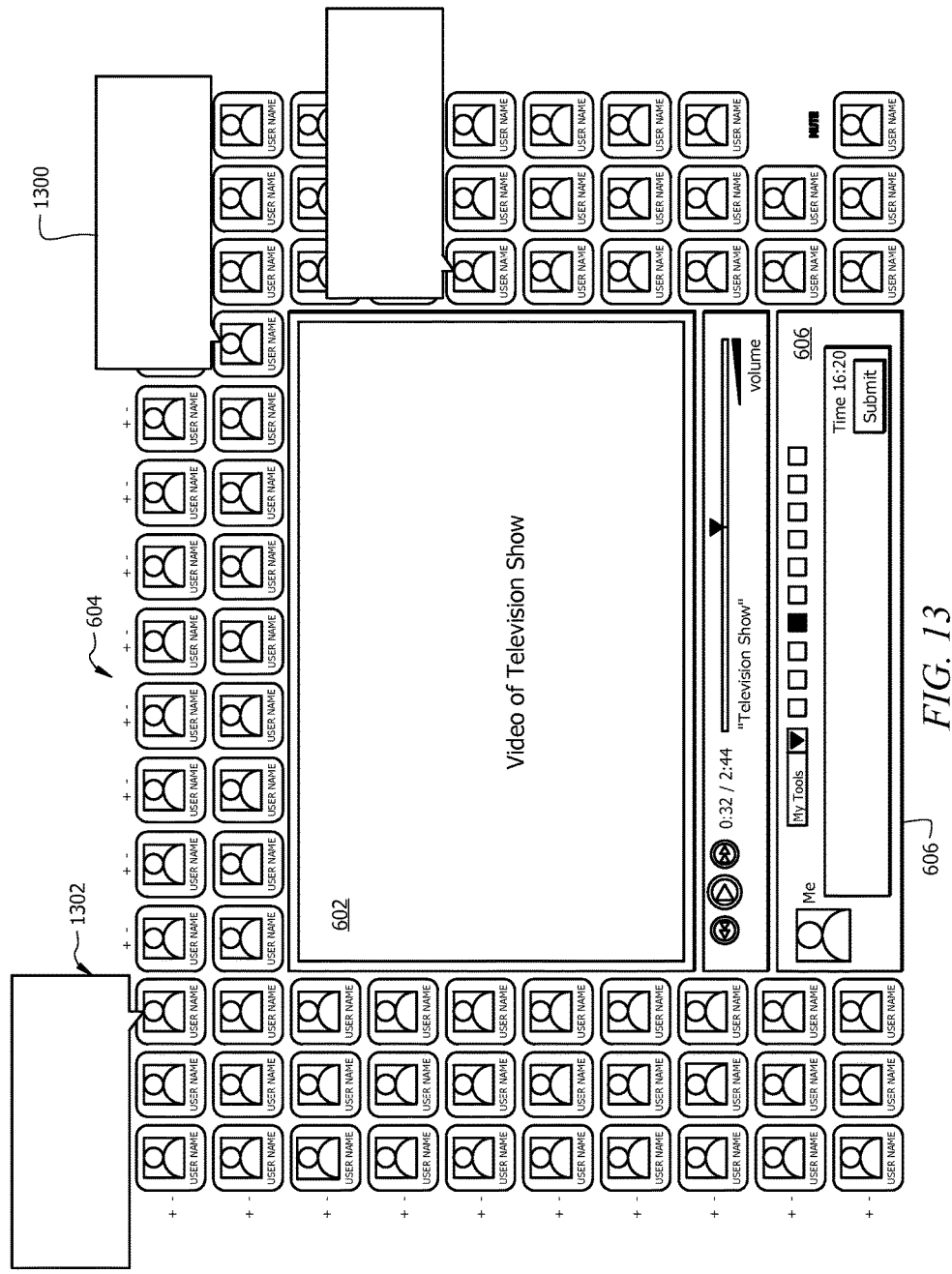
FIG. 13 is a schematic diagram of yet another embodiment of a user interface structure for implementing an asynchronous online viewing party.

The user interface may support various member editing features for managing which members are viewed in the Party Member Area panels 604. For example, FIG. 10 illustrates a convenient user interface mechanism for managing, viewing, or removing a current member. In this embodiment, the panel 604 includes a close box 1002. When the close box 1002 is clicked, the panel 604 is automatically removed from the user interface and an option window 1004 is presented. The option window 1004 displays other members of the AOVP (e.g., an avatar, screen name, brief description, etc.). The option window 1004 may include a scroll feature for navigating through a list of available members. To add a new member to the panel 604, an add button may be selected.

Figure 14:
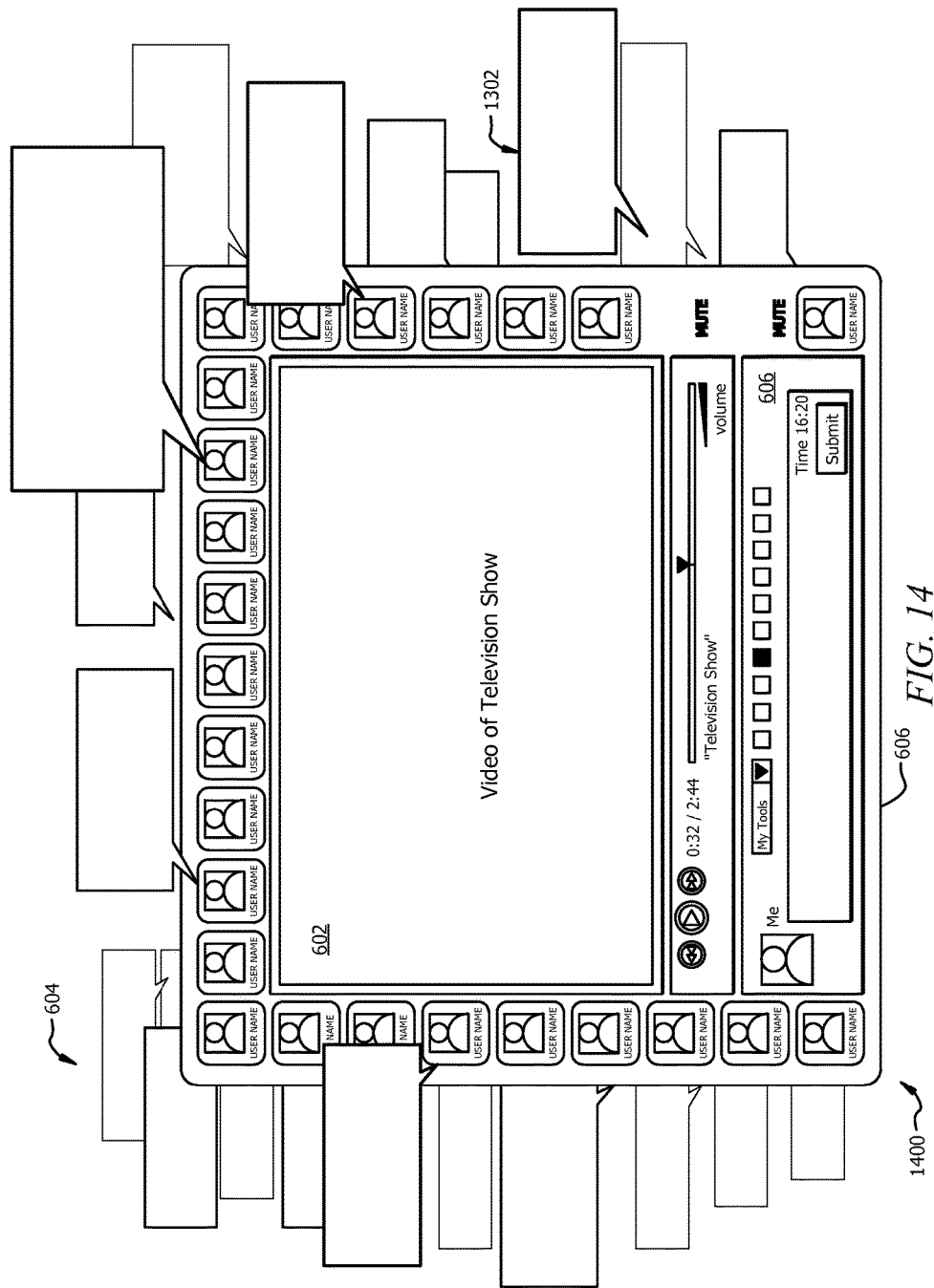
FIG. 14 is a schematic diagram of a further embodiment of a user interface structure for implementing an asynchronous online viewing party.

FIGS. 11-14 illustrate schematic representations of various alternative embodiments of a user interface structure for implementing an AOVP. The user interface structures are similar to the user interface structure 600 described above. In the embodiment illustrated in FIG. 11, the video panel 602 is located in the center of the screen area, with the Party Member Area panels 604 located around the video panel 602. The My Input/Party Area panel 606 may be located at the bottom portion of the screen. The member timelines 904 occupy a larger portion of the screen by extending toward the center of the screen above and below the video panel 602. The user interface structure 1200 illustrated in FIG. 12 decreases the size of the video panel 602 to accommodate Party Member Area panels 604 along the sides of and above the video panel 602. The user interface structure 1300 illustrated in FIG. 13 significantly decreases the size of the panels 604 by removing the member timeline 904 and other icons. The panels 604 may be limited to a screen name and an avatar. The smaller-sized panels 604 enable an audience-type orientation in which a plurality of rows of panels are provided around the video panel 602. During playback of the video in the video panel 602, member-generated events automatically appear as dialogue boxes 1302 originating from the corresponding panel 604. FIG. 14 illustrates a similar arrangement in which the dialogue boxes 1302 are stacked in z-space and scaled depending on the timecode 122 along the timeline 204. In this manner, the dialogue boxes 1302 gradually disappear over time, thereby allowing the member to observe the most recent comments.

The user interface structures need not display all participating members at the same time. For example, the user interface structure may support less panels 604 than the permitted maximum number of participating members in the AOVP. The AOVP system may be configured with a feature that automatically populates panels 604 with active comments without the viewing member having to add and/or remove participating members. As the content is played, a presentation management functionality may automatically remove a currently non-commenting member from a panel 604 to display a comment from a member that was not previously displayed in the panel 604. This feature may be enabled/disabled by the viewing member.

Having described the general working environment and various embodiments of user interface structures for implementing an AOVP, the general of additional embodiments of an AOVP (and associated systems and methods) will be described with reference to the user interface screen shots illustrated in FIGS. 15-30. It should be appreciated that the AOVP component 110 comprises the logic for providing the various user interface features and functions described above. Furthermore, the AOVP component 110 may be implemented in software, hardware, firmware, or a combination thereof. In one embodiment, the systems are implemented in software or firmware that is stored in a memory and that is executed by a suitable instruction execution system. In software or firmware embodiments, the logic may be written in any suitable computer language. Portions of the logic may reside on the computing device running the browser 102, while other portions may reside on the online viewing party server 106. In hardware embodiments, the systems may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One of ordinary skill in the art will know that any process or method descriptions associated with the operation of the AOVP may represent modules, segments, logic or portions of code which include one or more executable instructions for implementing logical functions or steps in the process. It should be known that any logical functions may be executed out of order from that described, including substantially concurrently or in reverse order, depending on the functionality involved, as would be understood by those reasonably skilled in the art.

Furthermore, the AOVP component 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic), a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 15:
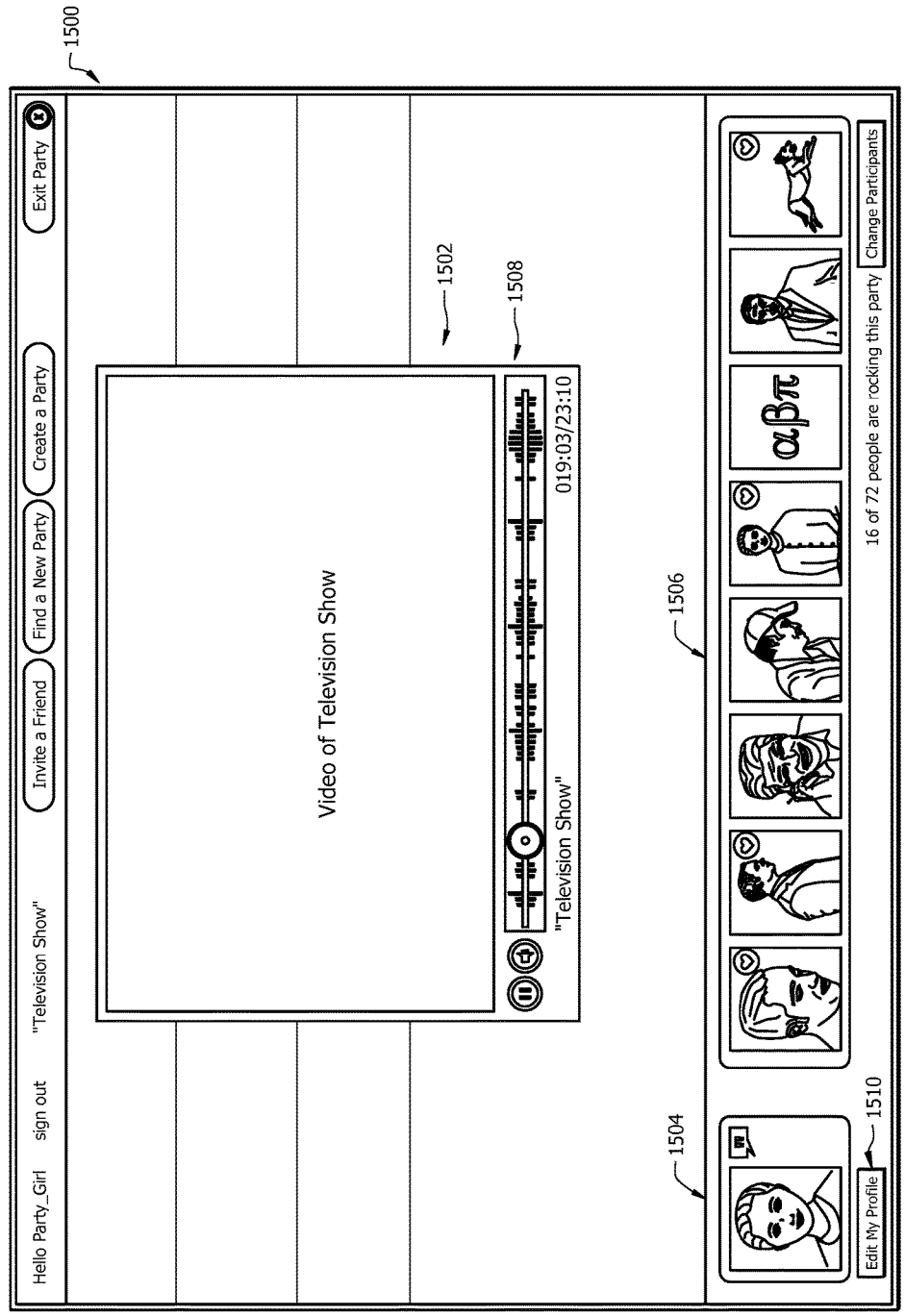
FIG. 15 is a screen shot of another embodiment of a user interface for implementing an asynchronous online viewing party via the platform of FIG. 1.
Figure 16:
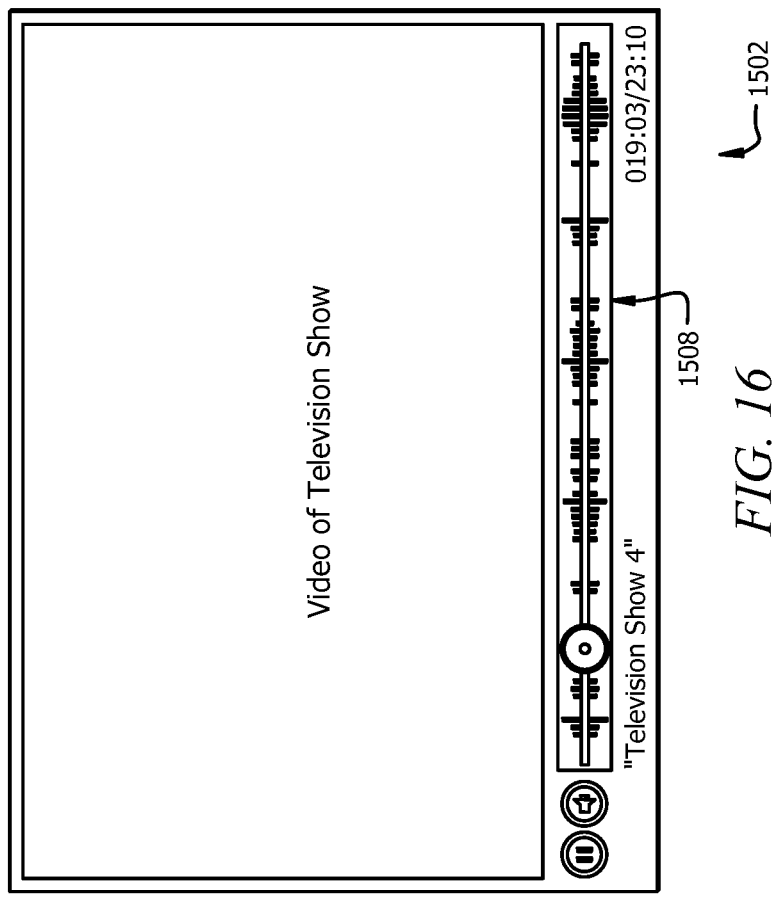
FIG. 16 illustrates the content panel of FIG. 15 in more detail.

FIG. 15 illustrates another embodiment of a user interface 1500 for implementing an AOVP. The user interface 1500 comprises a content area 1502, a viewer area 1504, and a participants area 1506. The content area 1502 is operatively associated with the content player 112 (FIG. 1). Referring to FIG. 16, the content area 1502 displays the content 202 and includes navigation controls for enabling the viewing member to interact with the content. The content area includes a timeline 1508 (similar to timeline 204) which generally displays the member-generated events 302 along the timeline 1508. As illustrated in FIG. 16, the timeline 1508 may visually distinguish time slots based on the number of member-generated events 302 per unit time. In the embodiment of FIG. 16, the Y-axis of the timeline is used to represent the number of events 302. Therefore, time slots with more events 302 may be represented with larger vertical bars on the timeline than those with less events 302. In this manner, the viewing member may easily determine areas in the content that may be of more interest, and then use the navigation features to quickly move to the corresponding portions on the timeline 1508. The viewer area 1504 comprises user features for enabling the viewing member to simultaneously generate events to be added to the timeline 1508 as the content is viewed. The participants area 1506 comprises a plurality of images associated with the participating members. The participants area 1506 is configurable by the viewing member.

Figure 17:
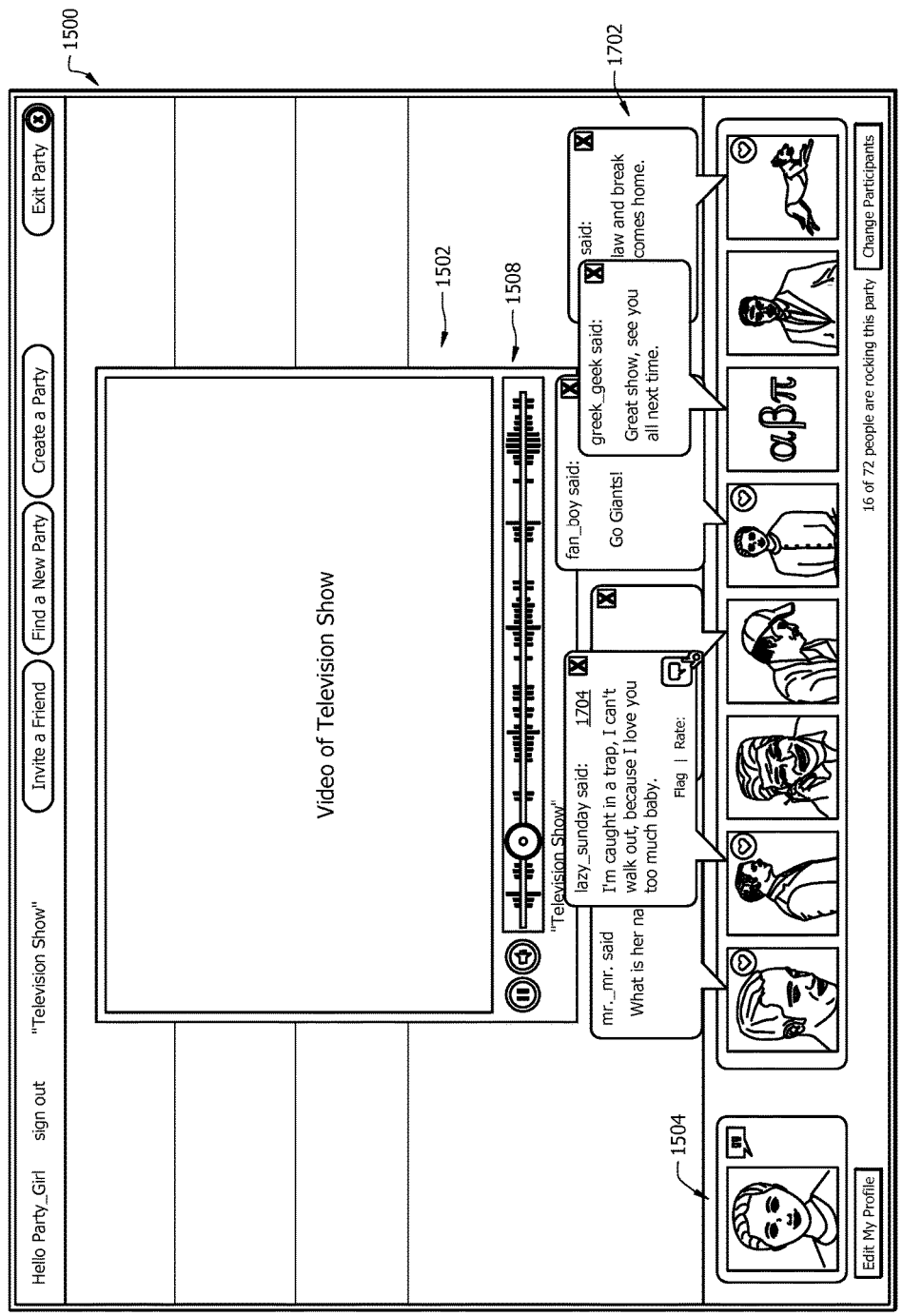
FIG. 17 illustrates the user interface with various member-generated events displayed in the participants' area.
Figure 18:
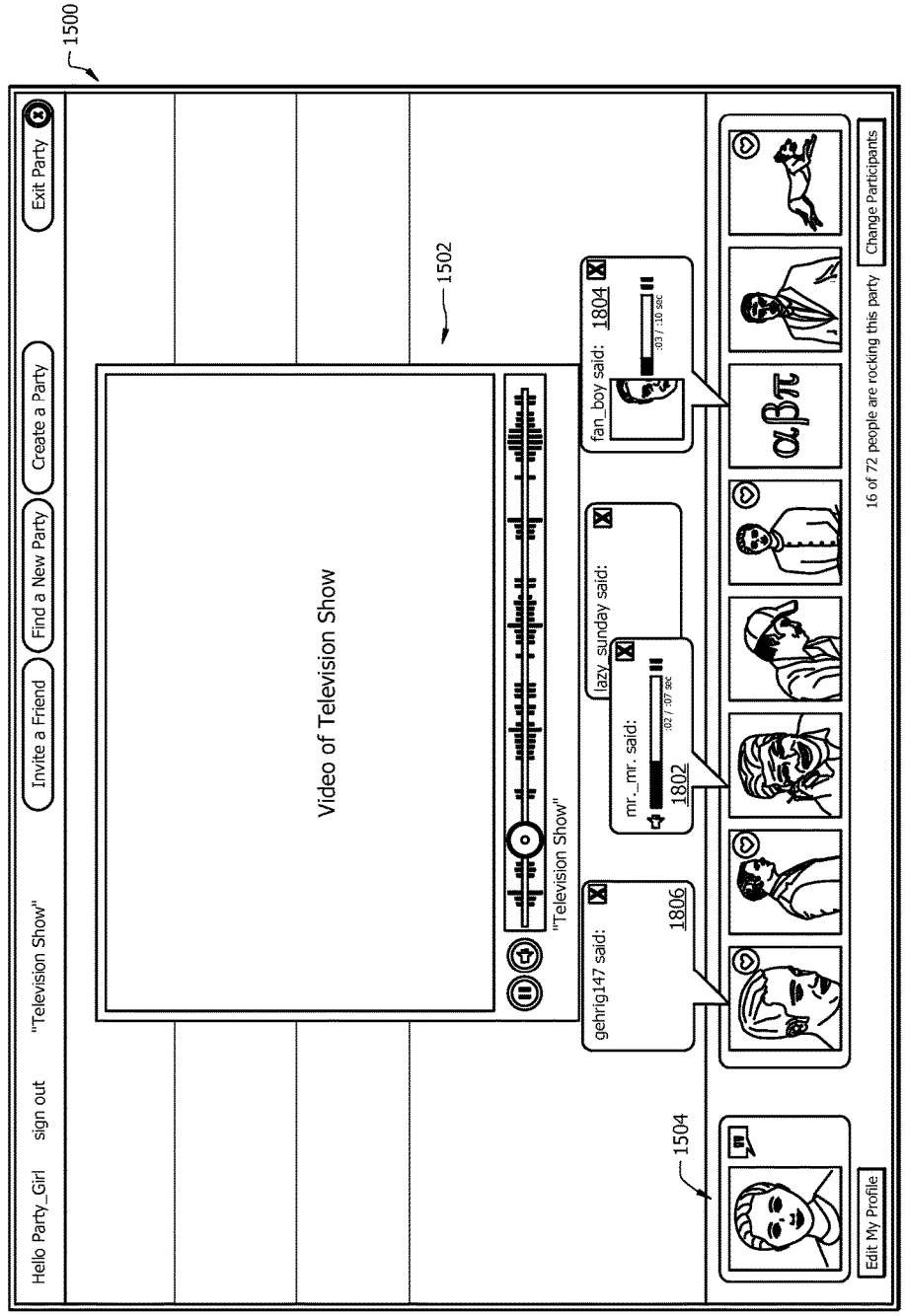
FIG. 18 illustrates the participants' area with an audio user event, a video user event, and an emoticon event.

In operation, as the content is played in the content area 1502, the member-generated events 302 associated with the members listed in the participants area 1506 may be automatically displayed. FIGS. 17 & 18 illustrate the automatic display of member-generated events 302 during playback. The system supports various forms of events. For example, in FIG. 17, the dialog boxes 1702 comprise text-based events. The dialog boxes 1702 may be configured with ranking buttons (e.g., dialog box 1704) for enabling the viewing member to provide feedback about the content contained in the dialog box. The AOVP system may aggregate the ranking feedback and provide member rankings based on the aggregated feedback. FIG. 18 illustrates additional forms of events, including an audio comment 1802, a video comment 1804, or an icon or graphic comment (e.g., an emoticon 1806).

Figure 19:
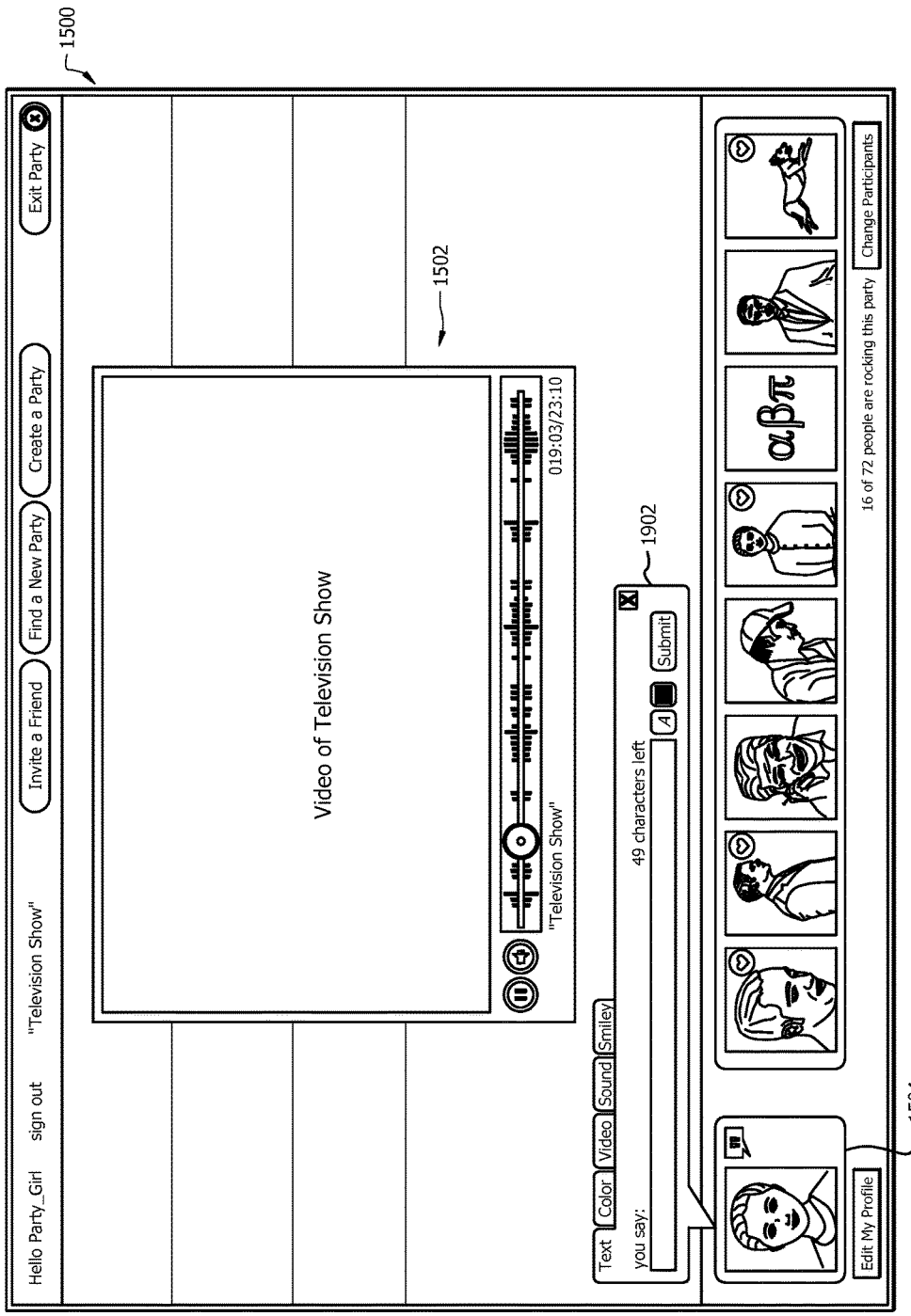
FIG. 19 illustrates an event submission mechanism for submitting member-generated events via the participants' area.
Figure 22:
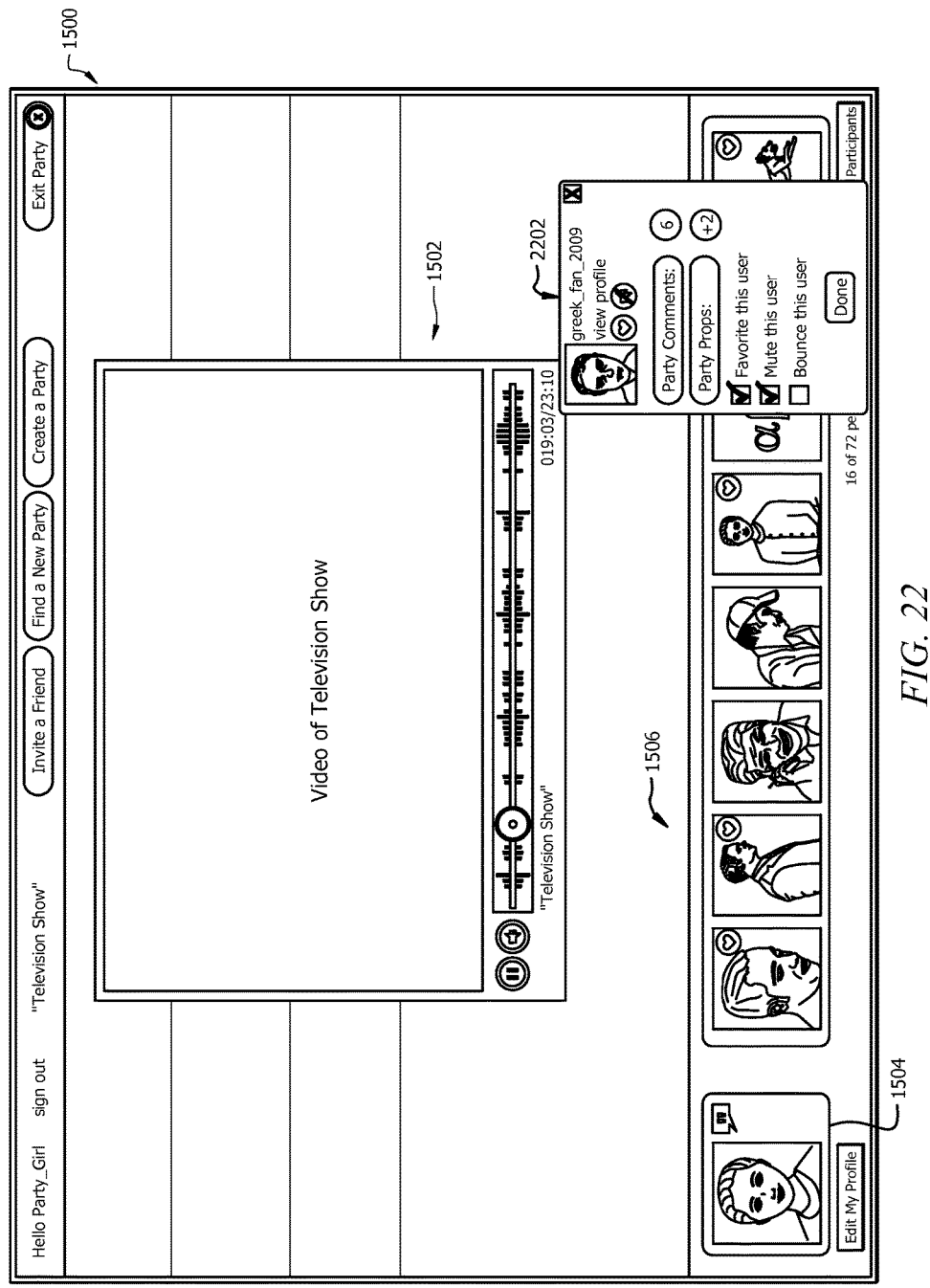
FIG. 22 illustrates an edit participant function provided via the members area.
Figure 23:
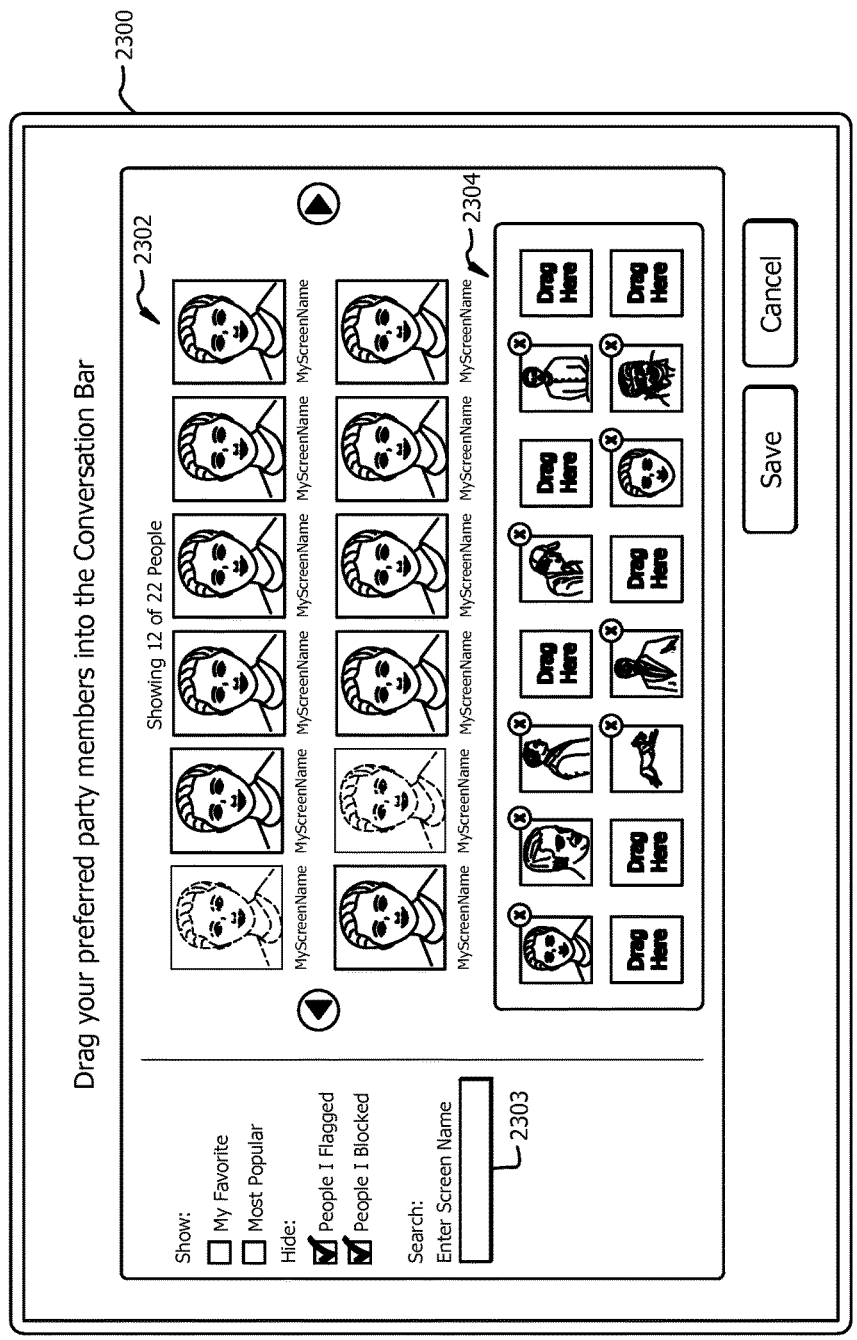
FIG. 23 is a screen shot of member management screen.

As mentioned above, the AOVP enables the viewing member to simultaneously consume the content in the content panel 1502, view member-generated events 302 provided at other times (or in real-time) by other members, and contribute additional member-generated events 302. FIG. 19 illustrates an example of an event submission mechanism. The viewing member may initiate the event submission process by clicking on the viewer panel 1504, which opens an event submission panel 1902. The event submission panel includes various tabs for generating different types of events. The "Text" tab enables the viewing member to generate a text-based comment. The "Color" tab enables the viewing member to customize the look and feel of the event being submitted. The "Video" tab enables the viewing member to generate a video comment. FIG. 22 illustrates the event submission panel with the "Sound" tab selected. The "Sound" tab enables the viewing member to generate an audio comment. The viewing member may record their own audio or select from a list of pre-recorded sounds. The "Smiley" tab enables the viewing member to generate a comment by selecting from a list of emoticons. Regardless the type of event, the event submission panel 1902 includes a submit button for sending the event to the online viewing party server 106. When viewing member generates an event via the user interface 1500, the AOVP component 102 captures the corresponding timecode 122 from the content player 112 (FIG. 1). The timecode 122 and the data related to the event are stored, for example, in the events database 120.

Figure 20:
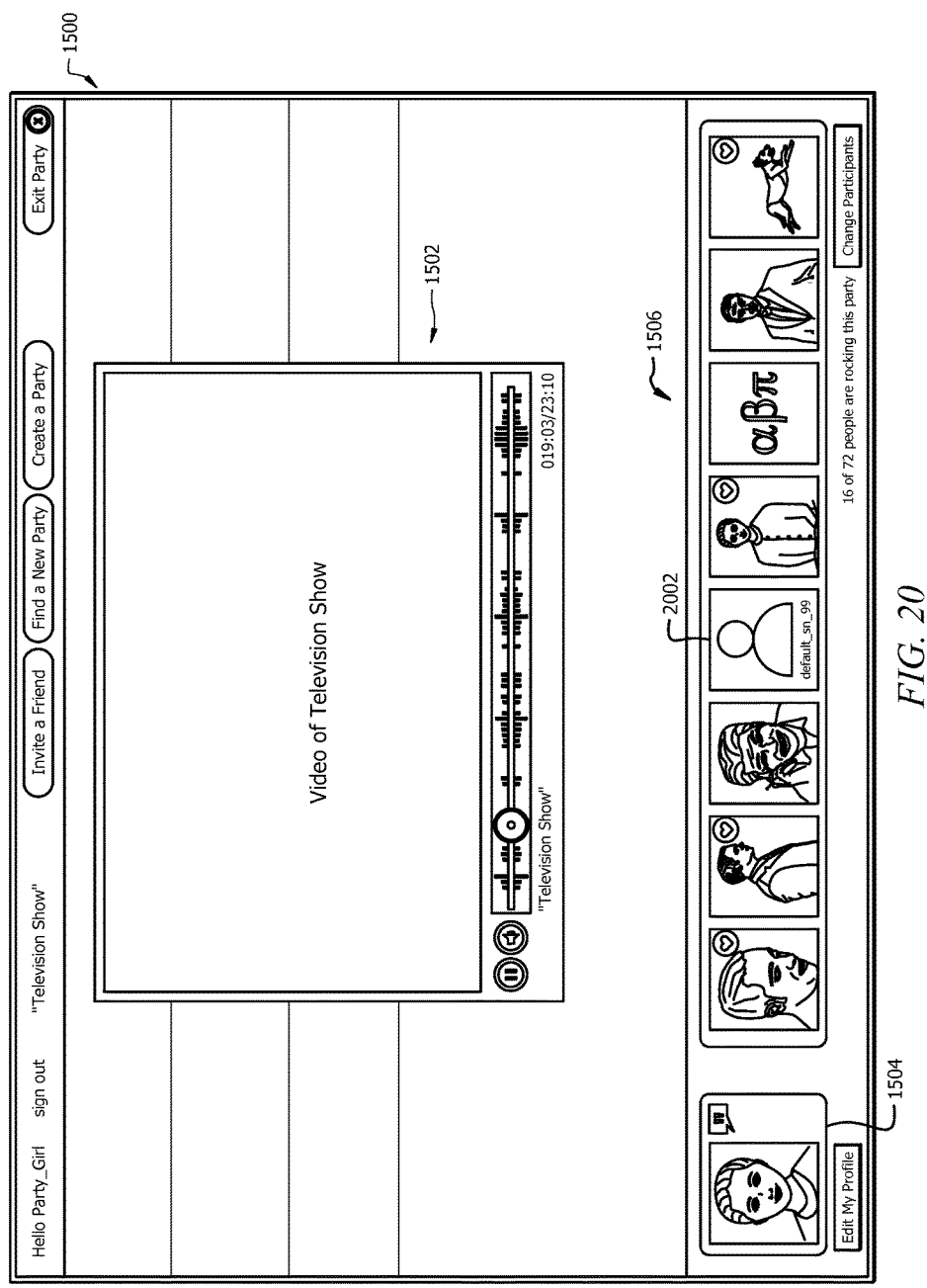
FIG. 20 illustrates a new party participant being added to the participants area.
Figure 21:
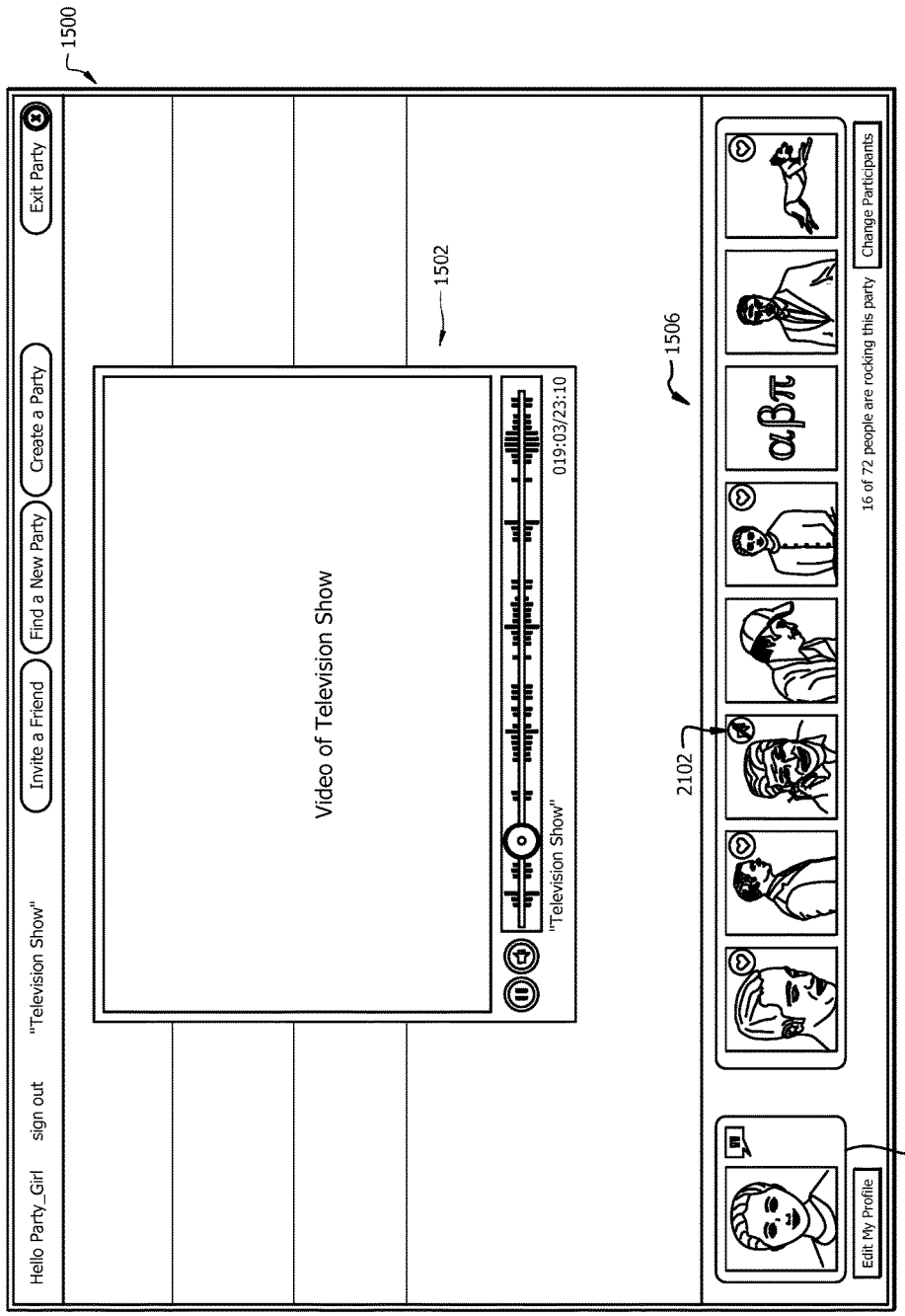
FIG. 21 illustrates a participant mute function provided via the participants area.
Figure 24:
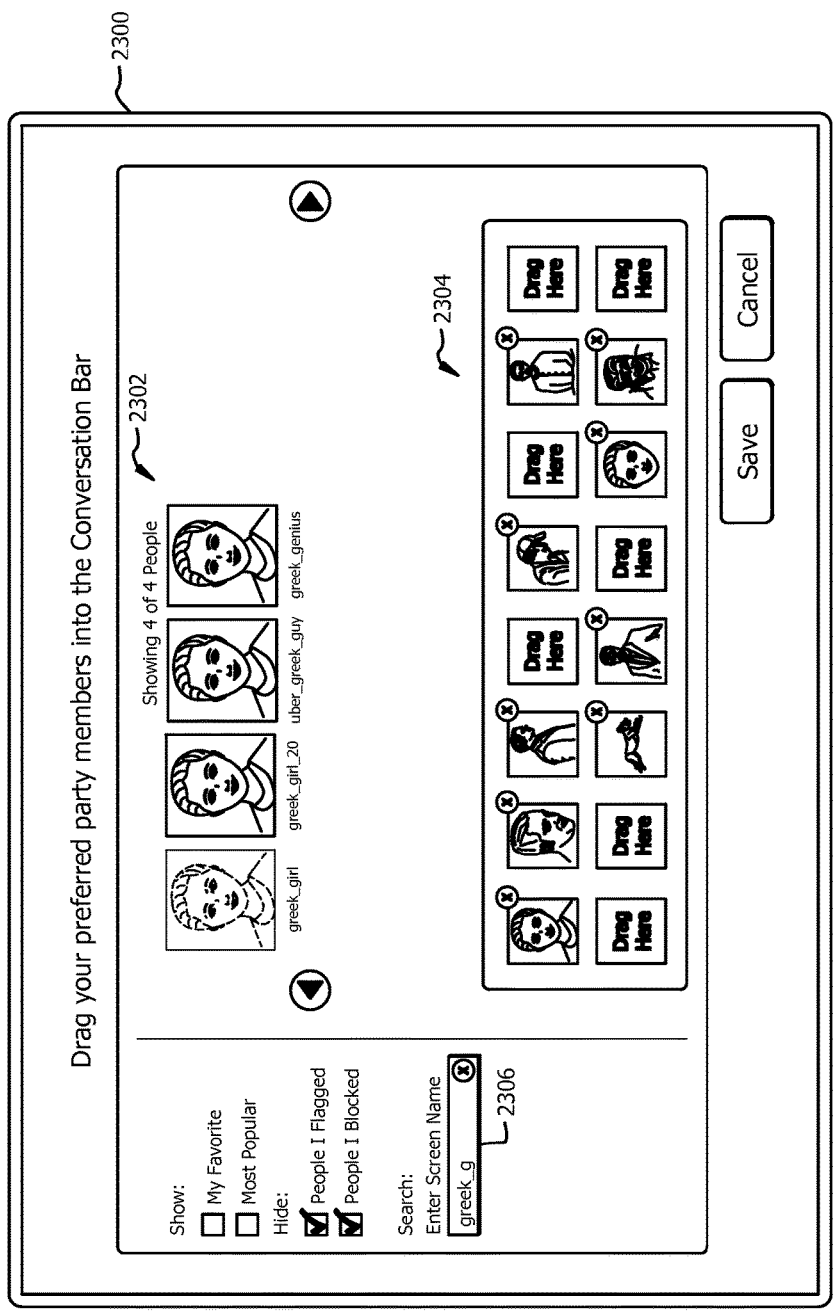
FIG. 24 illustrates a feature for searching for members by screen name.
Figure 25:
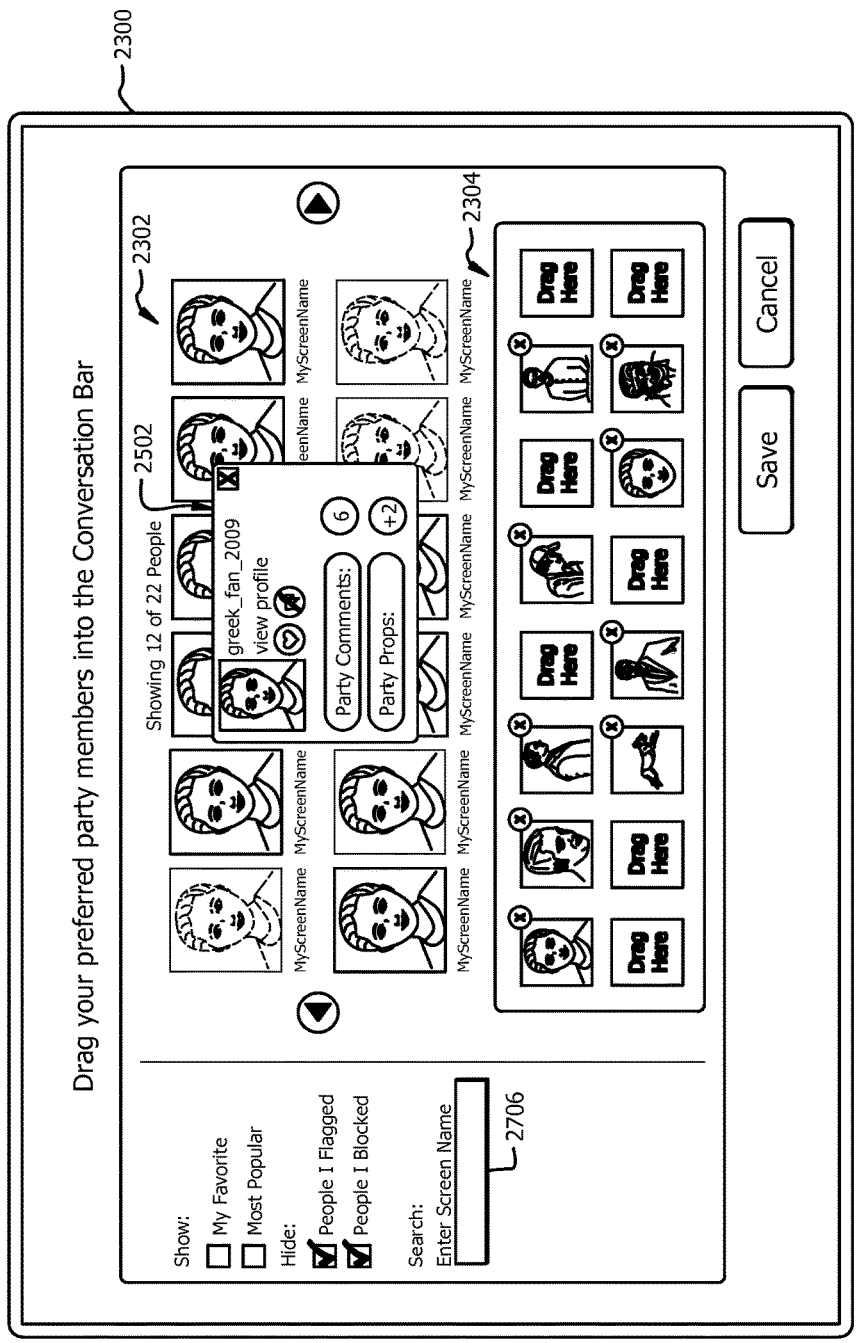
FIG. 25 illustrates a member profile pop-up.

The user interface 1500 may also include mechanisms for enabling the viewing member to edit, manage, and control the participating members displayed in the participants area 1506. As illustrated in FIG. 20, a participant image 2002 may be clicked to display the corresponding screen name and avatar. The participant image 2002 may include a mute button 2102 (FIG. 21) for enabling/disabling the display of events associated with a participant. As illustrated in FIG. 22, when a participant image 2002 is selected, a participant profile/control panel 2602 may be opened. The participant profile/control panel 2202 may include control elements for marking the participant as a "favorite", muting the participant, or deleting the participant. If the participant is deleted, the user interface 1500 may display another screen 2300 (FIG. 23) for enabling the viewing member to substitute another participant. The screen 2300 may include a list 2302 of party available participants and a list 2304 of current participants. The screen 2300 may be configured to enable the available members to be dragged from list 2302 to list 2304. The screen 2300 may further comprise a search mechanism 2306 for searching for available participants. FIG. 24 shows the list 2302 modified according to the search terms entered in the search mechanism 2306. From the list 2302, as illustrated in FIG. 25, the viewing member may view profiles 2502 of the available participants.

Figure 26:
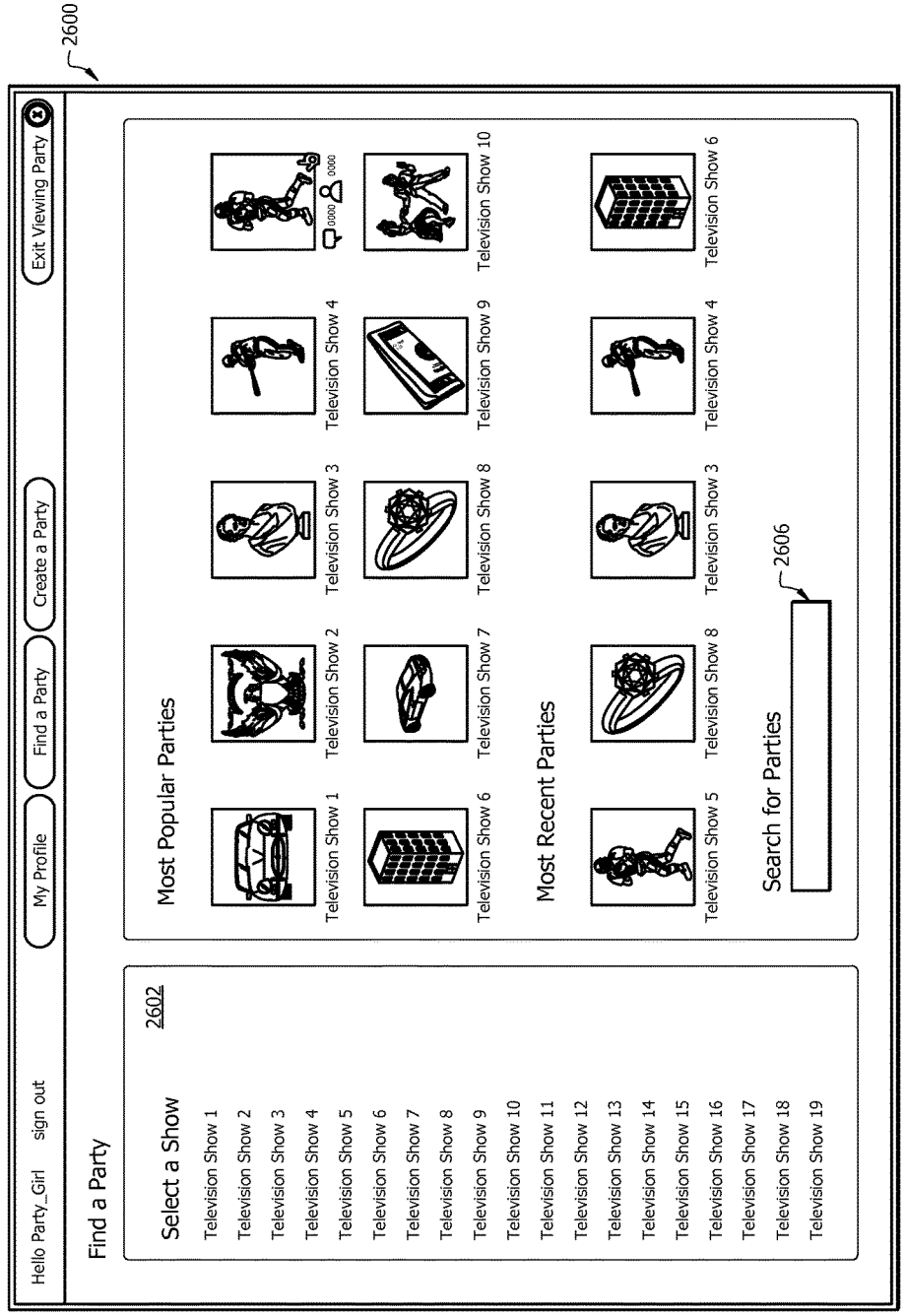
FIG. 26 is a screen shot of a party locator screen.
Figure 27:
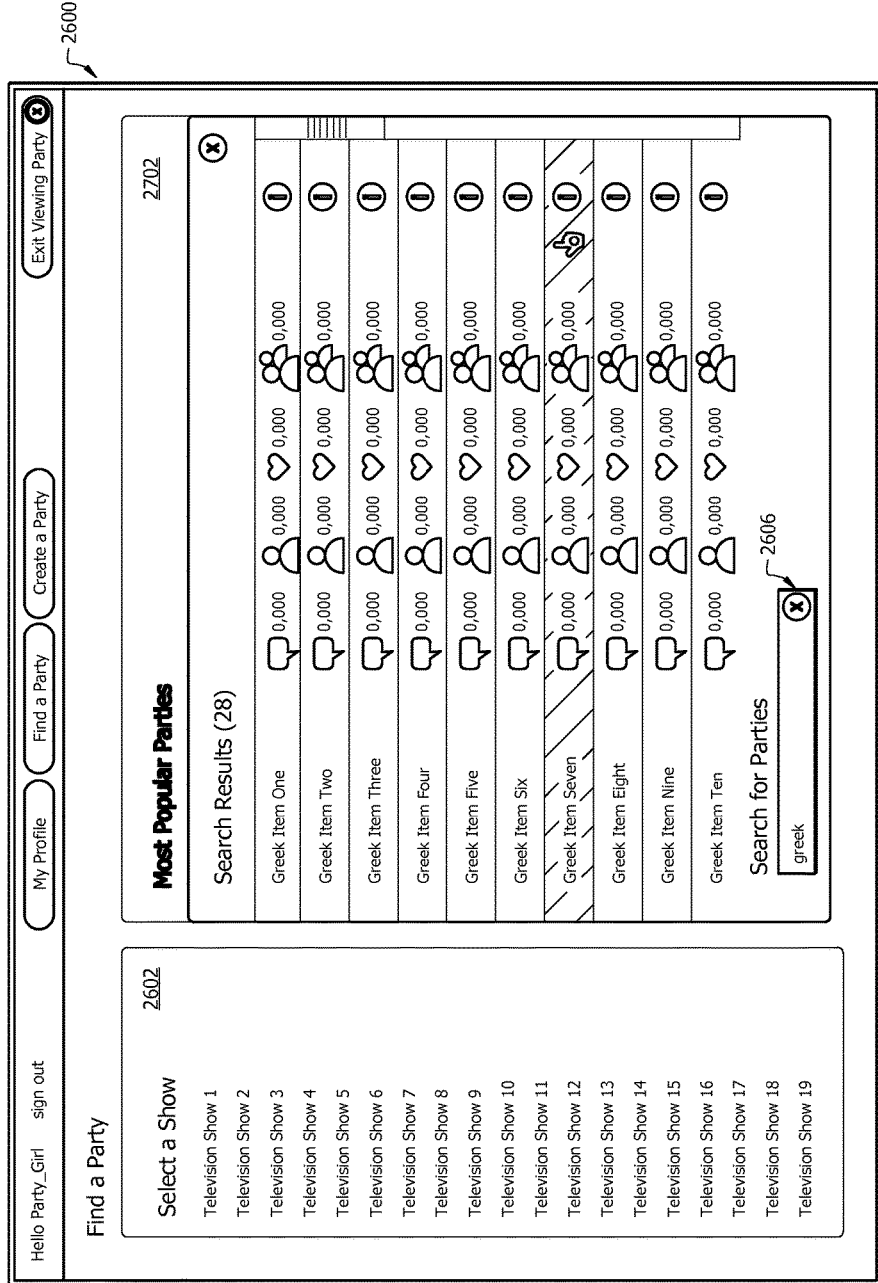
FIG. 27 illustrates a feature for searching for parties based on the name of the show.
Figure 28:
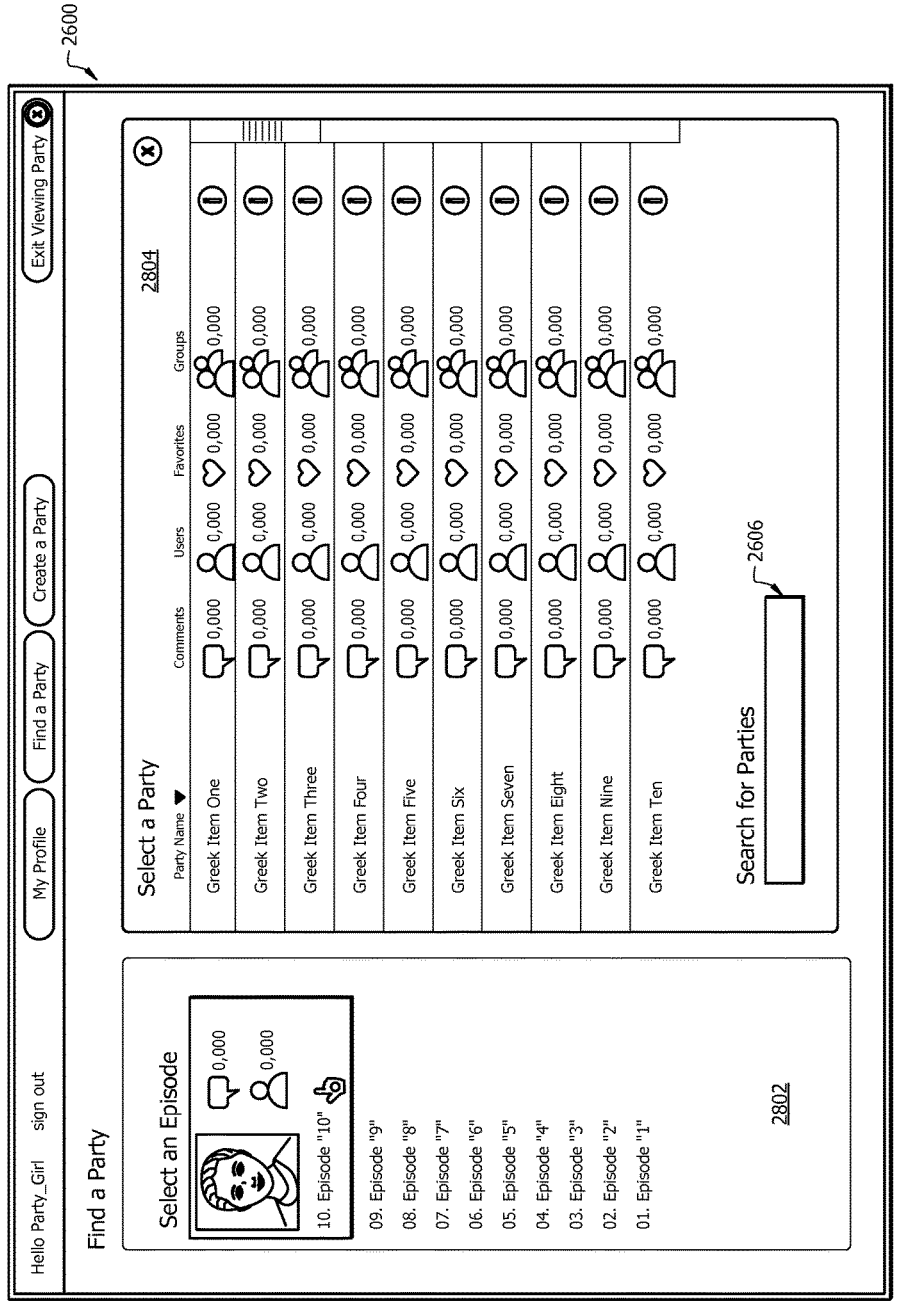
FIG. 28 illustrates a feature for searching for parties based on a particular episode of a show.

The user interface 1500 may comprise additional features for enabling the viewing member to search the parties database 118. FIG. 26 illustrates a party search screen 2600 comprising a show area 2602, a popular parties area 2604, and a party search mechanism 2606. The show area 2602 displays a list of shows for which an AOVP has been created. The popular parties areas 2604 displays a list of popular AOVPs, which may be based on member rankings, number of comments, number of parties, etc. The party search mechanism 2606 supports text or other searches of the parties database 118. FIG. 27 illustrates the screen 2600 with a search results overlay 2702 displaying the results of all available AOVPs containing the entered keyword "greek". FIG. 28 illustrates the screen 2600 with an area 2802 for enabling the viewing member to select based on episode, and a corresponding area 2804 displaying the AVOPs related to the selected episode.

Figure 29:
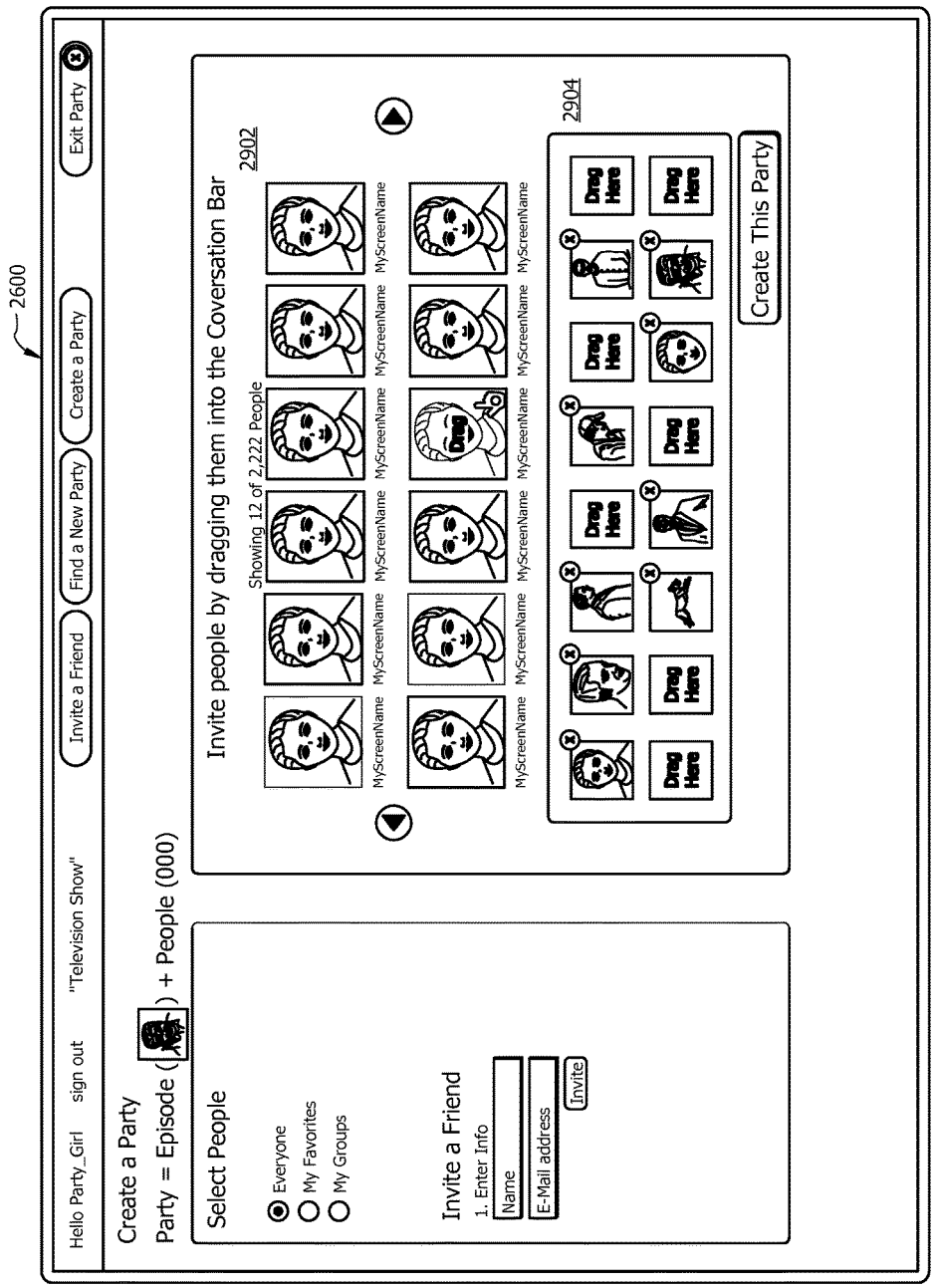
FIG. 29 is a screen shot of a party creation screen.
Figure 30:
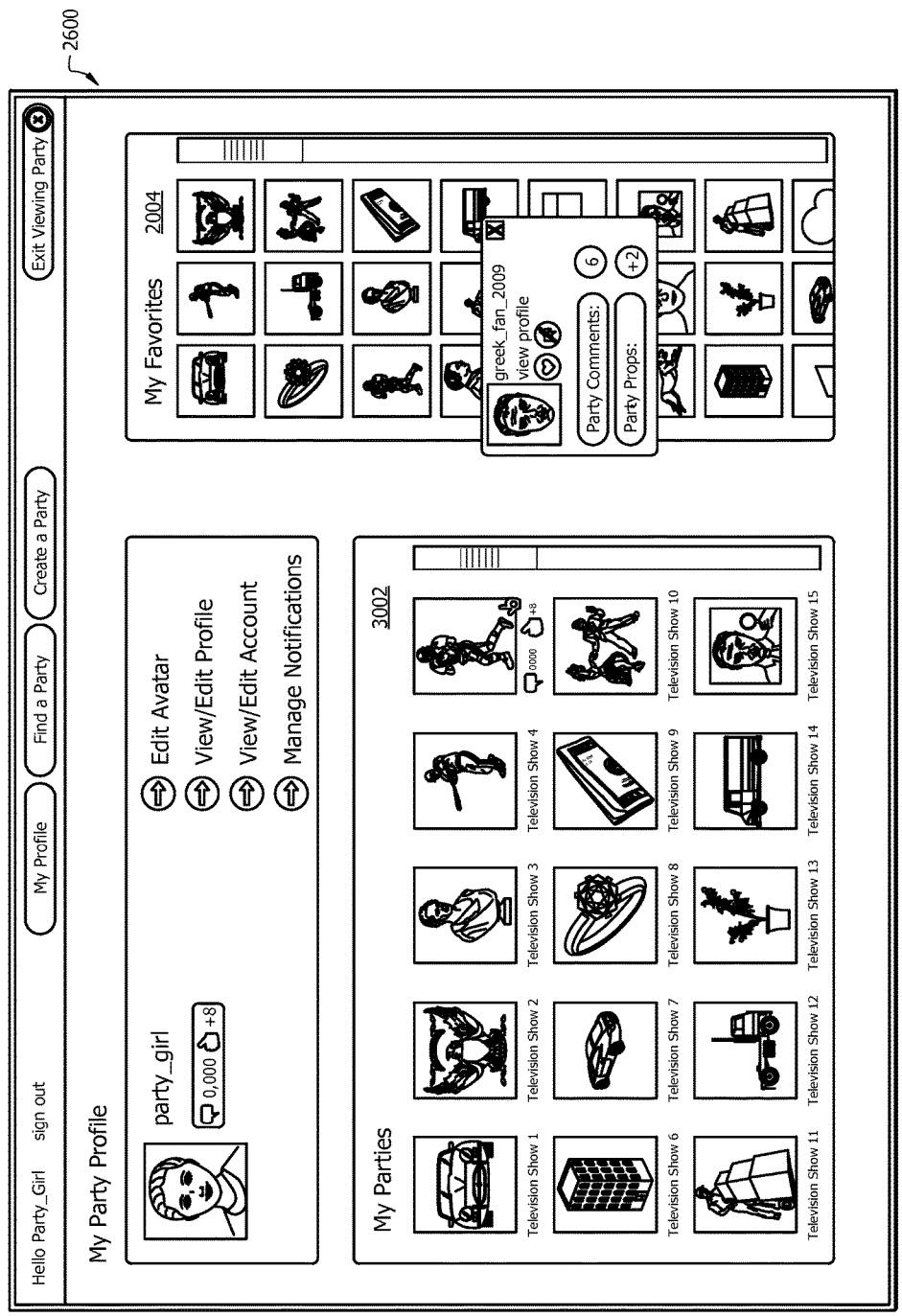
FIG. 30 is a screen shot of a member profile screen.

The user interface 1500 may include additional tabs (e.g., a "Create a Party" tab and a "My Profile" tab) for accessing additional features. As illustrated in FIG. 29, the "Create a Party" tab enables the viewing member to create an AOVP by dragging members from the list 2902 of available participants to the list 2904. Members may also be manually invited by inserting an email address. When creating a party for recurring content (e.g., television shows with multiple episodes), the viewing member may create a recurring AOVP. The AOVP may be initially created for the current episode of the show. However, when new episodes become available, the AOVP system may automatically create a new AOVP for the new episode. The new AOVP may be configured with the same participating members and other features as the previous AOVP. FIG. 30 illustrates the screen 2600 with the "My Profile" tab selected. The "My Profile" may include a list of current AOVPs in a My Parties area 3002 and a list 3004 of favorite participants. The "My Profile" screen may also include features for enabling the viewing member to edit profile properties (e.g., editing an avatar, editing account properties, and managing notifications).

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method comprising:
    creating a list of participants allowed to provide comments on a video content, the list of participants including a first participant and a second participant;
    receiving a first playback request for a video content provided using a first playback button of a first user interface;
    presenting, in response to the first playback request, the video content via the first user interface to the first participant;
    receiving a first comment from the first participant at a first time while presenting the video content, wherein the first comment comprises at least one of a text-based comment, a video comment, and an audio comment;
    linking the first comment to a first temporal location in the video content corresponding to the first time;
    receiving a second playback request for the video content provided using a second playback button of a second user interface;

presenting, in response to the second playback request, the video content via the second user interface to the second participant; and while presenting the video content via the second user interface to the second participant, presenting the comments only from each participant in the list of participants to the second participant via the second user interface, wherein the presenting of the comments to the second participant includes:

determining that the first temporal location in the video content corresponding to the first time is reached; and in response to the determining, presenting the first comment from the first participant to the second participant via the second user interface, wherein presenting the first comment comprises at least one of displaying the at least one of the text-based comment and the video comment, and generating sound corresponding to the audio comment, via the second user interface;

wherein the video content is one of a plurality of presently available episodes of a show, and wherein the method comprises automatically creating, using the list of participants, a new list of participants for a new episode of the show when the new episode becomes available.

2. The method of claim 1 further comprising:

receiving a second comment from the second participant at a second time while presenting the video content via the second user interface to the second participant;

linking the second comment to a second temporal location in the video content corresponding to the second time;

receiving a third playback request for the video content provided using a third playback button of a third user interface;

presenting, in response to the third playback request, the video content via the third user interface to a third participant in the list of participants;

while presenting the video content via the third user interface to the third participant, presenting the comments only from each participant in the list of participants to the third participant via the third user interface, wherein the presenting of the comments to the third participant includes:

determining that the first temporal location in the video content corresponding to the first time is reached;

in response to the determining the first temporal location in the video content while presenting the video content via the third user interface, presenting the first comment from the first participant to the third participant via the third user interface;

determining that the second temporal location in the video content corresponding to the second time is reached; and in response to the determining of reaching the second temporal location in the video content while presenting the video content via the third user interface, presenting the second comment from the second participant to the third participant via the third user interface.

3. The method of claim 2, wherein the first comment and the second comment are linked to the video content using a first timecode and a second time code, respectively.

4. The method of claim 2 further comprising:

receiving, from the third participant, a control element marking one of the first participant and the second participant as favorite.

5. The method of claim 2 further comprising:

receiving, from the third participant, a control element muting at least one of the first participant and the second participant.

6. The method of claim 2 further comprising:

receiving, from the third participant, a control element deleting at least one of the first participant and the second participant.

7. The method of claim 1, wherein the presenting of the video content via the second user interface comprises displaying a content timeline associated with the video content.

8. The method of claim 1, wherein when the video content reaches the temporal location, the first comment is temporarily presented in a pop-up dialog box.

9. The method of claim 1 further comprising:

sending an invitation by the first participant to the second participant to join the list of participants for commenting on the video content.

10. A server comprising:

a processor configured to:

create a list of participants allowed to provide comments on a video content, the list of participants including a first participant and a second participant;

receive a first playback request for a video content provided using a first playback button of a first user interface;

present, in response to the first playback request, the video content via the first user interface to the first participant;

receive a first comment from the first participant at a first time while presenting the video content, wherein the first comment comprises at least one of a text-based comment, a video comment, and an audio comment;

link the first comment to a first temporal location in the video content corresponding to the first time;

receive a second playback request for the video content provided using a second playback button of a second user interface;

present, in response to the second playback request, the video content via the second user interface to the second participant;

while presenting the video content via the second user interface to the second participant, presenting the comments only from each participant in the list of participants to the second participant via the second user interface, wherein the presenting of the comments to the second participant includes:

determining that the first temporal location in the video content corresponding to the first time is reached; and in response to determining, presenting the first comment from the first participant to the second participant via the second user interface, wherein presenting the first comment comprises at least one of displaying the at least one of the text-based comment and the video comment, and generating sound corresponding to the audio comment, via the second user interface;

wherein the video content is one of a plurality of presently available episodes of a show, and wherein the processor is further configured to automatically create, using the list of participants, a new list of participants for a new episode of the show when the new episode becomes available.

11. The server of claim 10, wherein the processor is further configured to:

receive a second comment from the second participant at a second time while presenting the video content via the second user interface to the second participant;

link the second comment to a second temporal location in the video content corresponding to the second time;

receive a third playback request for the video content provided using a third playback button of a third user interface;

present, in response to the third playback request, the video content via the third user interface to a third participant in the list of participants;

while presenting the video content via the third user interface to the third participant, presenting the comments only from each participant in the list of participants to the third participant via the third user interface, wherein the presenting of the comments to the third participant includes:

determining that the first temporal location in the video content corresponding to the first time is reached;

in response to determining the first temporal location in the video content while presenting the video content via the third user interface, presenting the first comment from the first participant to the third participant via the third user interface;

determining that the second temporal location in the video content corresponding to the second time is reached; and in response to determining of reaching the second temporal location in the video content while presenting the video content via the third user interface, presenting the second comment from the second participant to the third participant via the third user interface.

12. The server of claim 11, wherein the first comment and the second comment are linked to the video content using a first timecode and a second time code, respectively.

13. The server of claim 11, wherein the processor is further configured to:

receive, from the third participant, a control element marking one of the first participant and the second participant as favorite.

14. The server of claim 11, wherein the processor is further configured to:

receive, from the third participant, a control element muting at least one of the first participant and the second participant.

15. The server of claim 11, wherein the processor is further configured to:

receive, from the third participant, a control element deleting at least one of the first participant and the second participant.

16. The server of claim 10, wherein presenting the video content via the second user interface comprises displaying a content timeline associated with the video content.

17. The server of claim 10, wherein when the video content reaches the temporal location, the first comment is temporarily presented in a pop-up dialog box.

18. The server of claim 10, wherein the processor is further configured to:

send an invitation by the first participant to the second participant to join the list of participants for commenting on the video content.

\* \* \* \* \*